US011188830B2

(12) United States Patent
Li et al.

(10) Patent No.: US 11,188,830 B2
(45) Date of Patent: Nov. 30, 2021

(54) METHOD AND SYSTEM FOR USER PROFILING FOR CONTENT RECOMMENDATION

(71) Applicant: Oath, Inc., New York, NY (US)

(72) Inventors: Xiang Li, New York, NY (US); Sungjin Lee, Edgewater, NJ (US); Aasish Pappu, New York, NY (US); Yifan Hu, Mountain Lakes, NJ (US); Amanda Stent, New York, NY (US)

(73) Assignee: VERIZON MEDIA INC., New York, NY (US)

( * ) Notice: Subject to any disclaimer, the term of this patent is extended or adjusted under 35 U.S.C. 154(b) by 1214 days.

(21) Appl. No.: 15/057,487

(22) Filed: Mar. 1, 2016

(65) Prior Publication Data

US 2017/0255862 A1 Sep. 7, 2017

(51) Int. Cl.

| | |
|---|---|
| ***G06N 5/02*** | (2006.01) |
| ***G06N 20/00*** | (2019.01) |
| ***H04L 29/08*** | (2006.01) |
| ***G06Q 30/06*** | (2012.01) |
| ***G06F 16/9035*** | (2019.01) |
| ***G06Q 10/04*** | (2012.01) |

(52) U.S. Cl.

CPC ......... *G06N 5/022* (2013.01); *G06F 16/9035* (2019.01); *G06N 20/00* (2019.01); *G06Q 10/04* (2013.01); *G06Q 30/0631* (2013.01); *H04L 67/10* (2013.01); *H04L 67/306* (2013.01)

(58) Field of Classification Search

None

See application file for complete search history.

(56) References Cited

U.S. PATENT DOCUMENTS

| | | | | |
|---|---|---|---|---|
| 6,567,797 | B1 * | 5/2003 | Schuetze | G06F 16/30 |
| 8,055,664 | B2 * | 11/2011 | Baluja | G06N 5/02 707/749 |
| 8,352,319 | B2 * | 1/2013 | Wang | G06Q 30/0255 705/14.53 |
| 8,495,143 | B2 * | 7/2013 | Zhou | G06Q 10/10 709/204 |
| 8,751,427 | B1 * | 6/2014 | Mysen | H04L 67/306 706/46 |

(Continued)

OTHER PUBLICATIONS

Sacco, Giovanni M. "Dynamic Taxonomies: A Model for Large Information Bases." IEEE Transactions on Knowledge and Data Engineering vol. 12 [Published 2000] [Retrieved Jul. 2020] <URL: https://ieeexplore.ieee.org/abstract/document/846296> (Year: 2000).*

(Continued)

*Primary Examiner* — Michael J Huntley
*Assistant Examiner* — Fen Christopher Tamulonis
(74) *Attorney, Agent, or Firm* — Venable LLP

(57) ABSTRACT

The present teaching relates to generating user profiles with semantic knowledge. A first information associated with a user is obtained. One or more entities are identified from the first information. The one or more entities are augmented based on second information to generate a set of augmented entities. The set of augmented entities are clustered into a set of hierarchical clusters. A set of user profiles is generated based on the set of hierarchical clusters so that the user profile is to be used to personalize content recommendation.

18 Claims, 19 Drawing Sheets

(56) References Cited

U.S. PATENT DOCUMENTS

| | | | | |
|---|---|---|---|---|
| 2010/0030764 A1* | 2/2010 | Koren | G06Q 30/0201 705/7.29 |
| 2012/0197862 A1* | 8/2012 | Woytowitz | G06F 16/36 707/710 |
| 2014/0207518 A1* | 7/2014 | Kannan | G06Q 30/0201 705/7.29 |
| 2014/0280214 A1* | 9/2014 | Han | G06F 16/90 707/748 |

OTHER PUBLICATIONS

Lungu, Mircea et al. "Interactive Exploration of Semantic Clusters." IEEE 3rd IWVSUA [Published 2005] [Retrieved Jul. 2020] <URL: https://ieeexplore.ieee.org/abstract/document/1684313> (Year: 2005).*

Cantador I., Castells P. (2006) Multilayered . . . Ontology-Based User Profiles Clustering: Application to Collaborative Filtering. Managing Knowledge in a World of Networks. EKAW 2006. Lecture Notes in Computer Science, vol. 4248. Springer, Berlin, Heidelberg, https://doi.org/10.1007/11891451_30 (Year: 2006).*

G. Adomavicius et al., Toward the Next Generation of Recommender Systems: A Survey of the State-of-the-Art and Possible Extensions, IEEE Trans. on Knowledge and Data Engineering, vol. 17, No. 6, pp. 734-749, Jun. 2005.

D. Agarwal et al., Regression-Based Latent Factor Models, In Proceedings of KDD, pp. 19-28. ACM, 2009.

D. Agarwal et al., Spatio-temporal models for estimating click-through rate, pp. 21-30, 2009.

D. Agarwal et al., Personalized Click Shaping Through Lagrangian Duality for Online Recommendation, SIGIR '12, pp. 485-494, Aug. 12-16, 2012.

D. Agarwal et al., Activity Ranking in Linkedin Feed, In Proceedings of the 20th ACM SIGKDD International Conference on Knowledge Discovery and Data Mining, KDD '14, pp. 1603-1612, New York, NY, USA, 2014. ACM.

J. Bobadilla et al., Recommender Systems Survey. Knowledge-Based Systems, vol. 46, pp. 109-132, Jul. 2013.

L. Chen et al., Survey of Preference Elicitation Methods, Technical Report EPFL-REPORT-52659, EPFL, 2004.

A. S. Das et al., Google News Personalization: Scalable Online Collaborative Filtering, In Proceedings of the 16th International Conference on World Wide Web, pp. 271-280. ACM, May 8-12, 2007, Canada.

J. Dean et al., MapReduce: Simplified Data Processing on Large Clusters, Communication of the ACM, vol. 51, No. 1, pp. 107-113, Jan. 2008.

R. Gemulla et al., Large-scale matrix factorization with distributed stochastic gradient descent, In Proceedings of the 17th ACM SIGKDD International Conference on Knowledge Discovery and Data Mining, KDD '11, pp. 69-77, New York, NY, USA, 2011, ACM.

Y. Koren et al., Matrix factorization Techniques for Recommender Systems, IEEE Computer, vol. 42, No. 8, pp. 30-37, Aug. 2009.

L. Li et al., News Recommendation via Hypergraph Learning: Encapsulation of User Behavior and News Content, WSDM Proceedings of the Sixth ACM International Conference on Web Search and Data Mining, pp. 305-314, 2013.

M. Li et al., Scaling Distributed Machine Learning with the Parameter Server. In Proceedings of the 11th USENIX Conference on Operating Systems Design and Implementation, Proc. OSDI, pp. 583-598, Berkeley, CA, USA, 2014. USENIX Association.

J. Liu et al., Personalized News Recommendation Based on Click Behavior, In Proceedings of the 15th International Conference on Intelligent User Interfaces, 2010.

P. Lops et al., Content-Based Recommender Systems: State of the Art and Trends, In Recommender Systems Handbook, pp. 73-105. Springer, 2011.

Y. Low et al., Distributed GraphLab: A Framework for Machine Learning and Data Mining in the Cloud, Proceedings of the VLDB Endowment (PVLDB), vol. 5, No. 8, pp. 716-727 (2012).

X. Meng et al., Machine Learning in Apache Spark. CoRR, abs/1505.06807, 2015.

S. E. Middleton et al., Ontological User Profiling in Recommender Systems, ACM Trans. Inf. Syst., vol. 22, No. 1, pp. 54-88, 2004.

K. Pearson, On the criterion that a given system of deviations from the probable in the case of a correlated system of variables is such that can be reasonably supposed to have arisen from random sampling, Philosophical Magazine, vol. 50, pp. 157-175, 1900.

S. Rendle et al., Bpr: Bayesian Personalized Ranking from Implicit Feedback, In Proceedings of the Twenty-Fifth Conference on Uncertainty in Arlilicial Intelligence, pp. 452-461, Arlington, Virginia, United States, 2009, AUAI Press.

B. Sarwar et al. Item-Based Collaborative Filtering Recommendation Algorithms. In Proceedings of the 10th International Conference on World Wide Web, pp. 285-295, New York, NY, USA, 2001, ACM.

A. Sieg et al., Web Search Personalization with Ontological User Profiles. In Proceedings of the Sixteenth ACM Conference on Conference on Information and Knowledge Management, CIKM '07, pp. 525-534, New York, NY, USA, 2007, ACM.

A. P. Singh et al., Relational Learning via Collective Matrix Factorization, In Proceedings of the 14th ACM SIGKDD International conference on Knowledge discovery and data mining, pp. 650-658, 2008.

K. Sparck Jones, Document Retrieval Systems, Chapter A Statistical Interpretation of Term Specificity and Its Application in Retrieval, pp. 132-142. Taylor Graham Publishing, London, UK, UK, 1988.

D. H. Stern et al., Matchbox: Large Scale Online Bayesian Recommendations. In Proceedings of the 18th International Conference on World Wide Web, WWW '09, pp. 111-120, New York, NY, USA, 2009.

K. Sugiyama et al., Adaptive Web Search Based on User Profile Constructed Without Any Effort From Users, In Proceedings of the 13th International Conference on World Wide Web, pp. 675-684, New York, NY, USA, 2004, ACM.

K. Varda. Protocol Buffers: Google's Data Interchange Format, Technical Report, Google, Jul. 7, 2008.

G. I. Webb et al., Machine Learning for User Modeling, User Modeling and User-Adapted Interaction, vol. 11, pp. 19-29, 2001.

X. Yi et al., Beyond clicks: Dwell Time for Personalization. In Proceedings of the 8th ACM Conference on Recommender Systems, RecSys '14, pp. 113-120, New York, NY, USA, 2014, ACM.

J. Zhang et al., Flexible Latent Variable Models for Multi-Task Learning , Mach. Learn., vol. 73, No. 3, pp. 221-242, Dec. 2008.

E. Zhong et al., Building Discriminative User Profiles for Large-scale Content Recommendation, Proceedings of the 21th ACM SIGKDD International Conference on Knowledge Discovery and Data Mining, KDD '15, pp. 2277-2286, Sydney, NSW, Australia, 2015.

Y. Zhuang et al., A Fast Parallel SGD for Matrix Factorization in Shared Memory Systems . In Proceedings of the 7th ACM Conference on Recommender Systems, ReeSys '13, pp. 249-256, New York, NY, USA, 2013, ACM.

I. Zukerman et al., Predictive Statistical Models for User Modeling. User Modeling and User-Adapted Interaction, vol. 11, pp. 5-18, 2001.

* cited by examiner

METHOD AND SYSTEM FOR USER PROFILING FOR CONTENT RECOMMENDATION

BACKGROUND

1. Technical Field

The present teaching relates to methods, systems, and programming for user profiling for content recommendation over the internet. In particular, the present teaching relates to methods, systems, and programming for user profiling for content recommendation by leveraging semantic knowledge.

2. Discussion of Technical Background

User profiling is used for content recommendation, personalized web search, ads push, etc. to enhance the user experience. The goal of the user profiling is to represent users' interests in the same feature space as that of the items being recommended. Modeling user interests is an important challenge for personalized search and recommendation. A thorough understanding of the user interests expressed explicitly through search queries or implicitly through content view and ad clicks is a necessity to provide content that meets the user's requirements. As such, accurate understanding of current user interests and predicting their future interests are core tasks for user interest modeling. For example, a query such as "ACL" could be interpreted differently depending on what entities the users have previously queried or read on the pages, such as "Anterior Cruciate Ligament" vs. "Information Extraction" vs. "Jose Gonzalez" (musician). This contextual semantic knowledge extracted from queries and page content could be used to facilitate understanding of the current and future user interests. The result could be further employed to dynamically adapt search interfaces to support different tasks, such as re-ranking search results, classifying the query, suggesting alternative query formulations, or recommending news feed or ads. Traditionally, user interests are modeled using different sources of profile information, e.g., explicit demographic or interest profiles, or implicit profiles based on previous queries, search result clicks, general browsing activity, or richer desktop indices, etc. Further, user preference is usually inferred from the user activities, e.g., clicking on a hyperlink, viewing/saving/bookmarking a page, etc., rather than from understanding the semantics of the queries and the content of visited pages.

The recent use of deep semantic knowledge based on user activities on the internet allows furnishing rich contextual information associated with the user profiles. For example, Yahoo Knowledge Graph is one type of knowledge base comprising deep semantic knowledge about entities extracted from the search queries or the content of the webpages that the users have visited. Given the query "Jose Gonzalez," the user interest can be inferred in music based on the fact that "Jose Gonzalez" is a singer-songwriter from the Yahoo Knowledge Graph. Hence, the user interests can be modeled from a deep semantic aspect by investigating the information based on the entities that the users expressed interest in. An existing art infers the user interests from semantics by analyzing topics from queries that the user inputted and the URL contents that the user has viewed. However, topics are too general to accurately capture the specific entities or areas that the users are interested in. For example, inferring the user interest in "sports" by analyzing the user query "Michael Jordan" is too general and not accurate because the user may be interested in the basketball sports only.

There are several products that recommend articles, videos, products etc. based on user's search behavior including Google Now Cards based on personal web queries, Facebook notifications based on "likes," Amazon's product recommendation based on recent product queries and checkouts, YouTube's recommended videos based on viewing history, etc. The above recommending products limit themselves to heavily utilizing surface-level features, such as user demographic profile, browsing activities, and counting of named entities, but without rich semantic features.

Therefore, there is a need to provide an improved solution for user profiling for content recommendation to tackle the above-mentioned challenges.

SUMMARY

The present teaching relates to methods, systems, and programming for user profiling for content recommendation over the internet. In particular, the present teaching relates to methods, systems, and programming for user profiling for content recommendation over the internet.

According to some embodiments of the present teaching, a method implemented on a computing device having at least one processor, storage, and a communication platform connected to a network for generating user profiles with semantic knowledge comprises obtaining first information associated with a user; identifying one or more entities from the first information; augmenting the one or more entities based on second information to generate a set of augmented entities; clustering the set of augmented entities into a set of hierarchical clusters; and generating a set of user profiles based on the set of hierarchical clusters so that the user profile is to be used to personalize content recommendation.

In some embodiments, the method further comprises identifying at least one related entity from the second information that relates to the one or more entities; and adding the at least one related entity to the one or more entities to generate the set of augmented entities, wherein the second information comprises a knowledge archive of named entities.

In some embodiments, the method further comprises estimating user interests with respect to the set of augmented entities; and incorporating the user interests with respect to the set of augmented entities into the user profile.

In some embodiments, estimating user interests with respect to the set of augmented entities further comprises identifying known user interests with respect to the one or more entities based on semantic relationships between the one or more entities; estimating inferred user interests with respect to the at least one related entity based on semantic relationships between the at least one related entity and the one or more entities; and estimating strength of the user interests with respect to the set of augmented entities in accordance with the inferred user interests.

In some embodiments, the method further comprises applying a latent factor model to estimate the user interest, wherein the latent factor model is trained using user interaction data.

In some embodiments, all aspects of user interests are organized in a hierarchical structure to form the set of user profiles and each of the set of user profiles defines an aspect of user interests.

According to another embodiment of the present teaching, a system having at least one processor, storage, and a communication platform for generating user profiles with semantic knowledge comprises a user activity analyzer configured to obtain first information associated with a user;

an entity extractor configured to identify one or more entities from the first information; an entity augmenting module configured to augment the one or more entities based on second information to generate a set of augmented entities; an entity clustering module configured to cluster the set of augmented entities into a set of hierarchical clusters; and a user profile generating module configured to generate a set of user profiles based on the set of hierarchical clusters so that the set of user profiles is to be used to personalize content recommendation.

In some embodiments, each of the set of hierarchical clusters defines a hierarchical relationship among at least part of the set of augmented entities.

According to yet another embodiment of the present teaching, a non-transitory machine-readable medium having information recorded thereon for generating user profiles with semantic knowledge, where the information, when read by the machine, causes the machine to perform obtaining first information associated with a user; identifying one or more entities from the first information; augmenting the one or more entities based on second information to generate a set of augmented entities; clustering the set of augmented entities into a set of hierarchical clusters; and generating a set of user profiles based on the set of hierarchical clusters so that the set of user profiles is to be used to personalize content recommendation.

According to yet another embodiment of the present teaching, a method implemented on a computing device having at least one processor, storage, and a communication platform connected to a network for recommending content using user profiling comprises receiving an input from a user; generating a set of user profiles based on information associated with the user and a knowledge archive; augmenting the set of user profiles based on a set of pre-constructed user profiles; and recommending content to the user in response to the input based on the set of augmented user profiles, wherein each of the set of user profiles defines an aspect of user interests with respect to a plurality of entities.

In some embodiments, generating a set of user profiles based on information associated with the user and a knowledge archive further comprises obtaining first information associated with the user; identifying one or more entities from the first information; augmenting the one or more entities based on the knowledge archive to generate a set of augmented entities; clustering the set of augmented entities into a set of hierarchical clusters; and generating the set of user profiles based on the set of hierarchical clusters.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
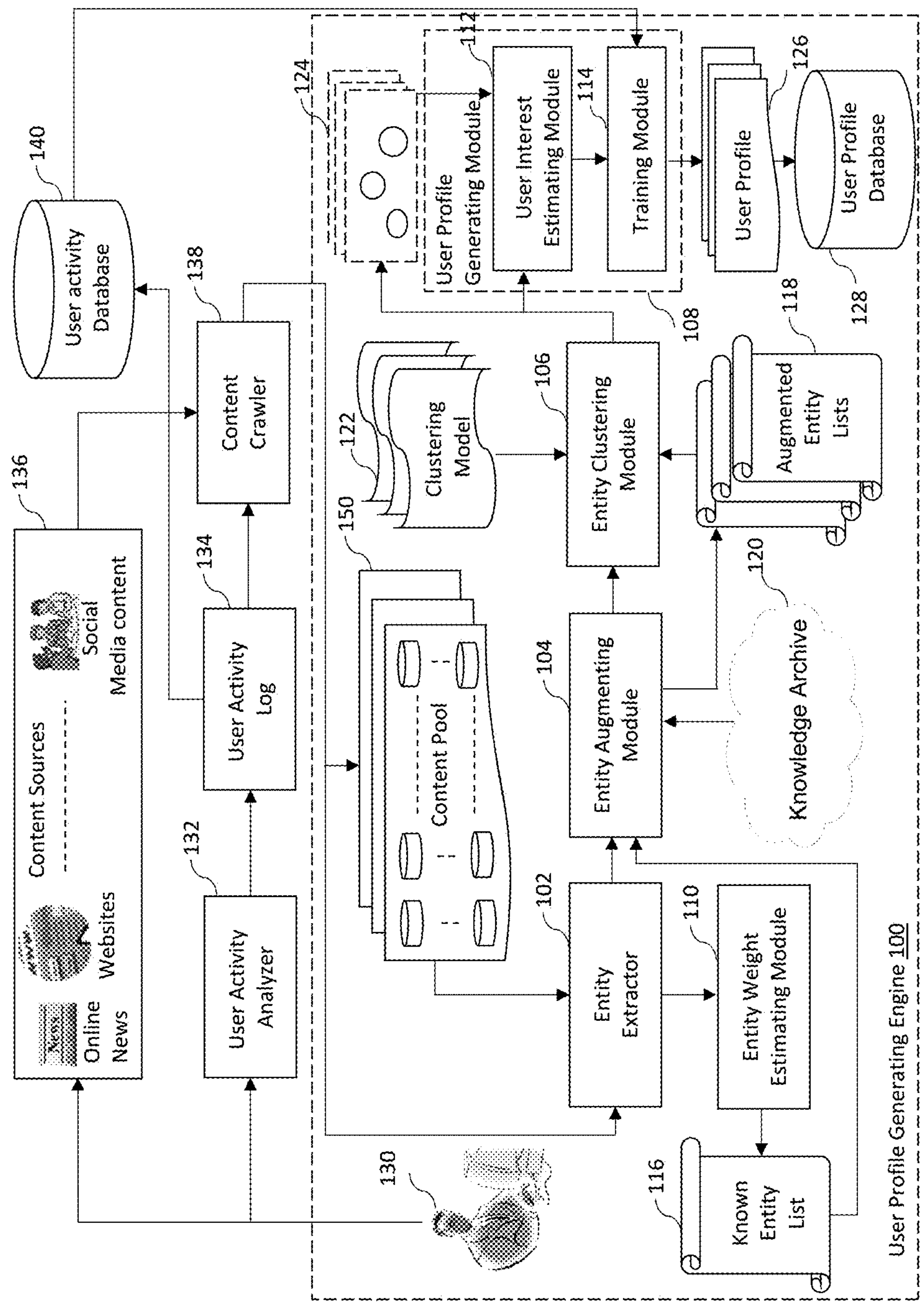
FIG. 1 illustrates an exemplary system diagram of user profiling for content recommendation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching focuses on developing models capable of accurately predicting future user interests by exploiting deep semantic knowledge encoded in the search queries and webpage contents that the users visited through the named entities. Named entities appearing in the search queries, contents, and stream news articles are important to know what the web pages are about. Named entities have ontological features, such as types, attributes, and relationships with other named entities, which are hidden from their textual appearance. The present teaching recognizes the named entities from queries and page contents, links the recognized named entities to the entities in the Yahoo Knowledge Graph, extracts information from the Yahoo Knowledge Graph, infers relational information between the named entities, generates augmented named entities, clusters the augmented named entities in multiple hierarchical structures. Utilizing the semantic knowledge encoded in the queries, contents, ads, and other sources to generate multi-aspects of user profile in a hierarchical structure can improve the understanding about users' interests, which can be further used to better predict the user's interests and recommend content to the users. The predictive model can be used for a wide variety of applications, including supporting pro-active changes to the interface to emphasize results of likely interest or to suggest contextually-relevant query alternatives, more traditional applications to ranking and filtering, news feed and appropriate ads recommendation, etc.

The present teaching describes various aspects of the invention including but not limited to user profiling, recommendation systems, and latent factor models. The goal of the present teaching is to model user's interests and provide personalized content recommendation within a large-scale framework. As such, a frame work—Factorization Machine is applied to overcome both data sparsity and cold-start problems and to infer user interest vectors. The present teaching exploits more semantic knowledge and entities in addition to those appearing in each user's previous click history and content categories as features, to enrich the feature space by utilizing the related entities extracted from a knowledge base, and augments seen entities with similar unseen entities. Therefore, the present teaching can take advantage of the abundant knowledge stored in the knowledge base such as, Yahoo Knowledge Graph and entity embedding vectors that are generated from huge amounts of data to capture users' preferences more from the semantic knowledge aspect. Further, the present teaching can also derive the latent characteristics from multiple granularities and levels of entities and concepts. This also enables the user profiling model to predict users' future interests for a long-term period.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates an exemplary system diagram of user profiling for content recommendation, according to an embodiment of the present teaching. User profiling generating engine 100 comprises an entity extractor 102, an entity augmenting module 104, an entity clustering module 106, a user profile generating module 108, an entity weight estimating module 110, a knowledge archive 120, a user profile database 128, a user activity database 140, and a content pool 150. Information related to a user's activities are collected and stored in content pool 150. Such information may include queries, page titles, and content from pages that the user has searched, visited, or viewed from the user click logs. From content pool 150, entity extractor 102 periodically extracts a plurality of elements related to the user activities. Entity extractor 102 further locates and classifies the plurality of elements into pre-defined categories such as the names of persons, organizations, locations, expressions of times, quantities, monetary values, percentages, etc., and generates a known entity list 116. Each known entity in the list is assigned with a weight indicating the user's known interest level. The weights of the known entities may be estimated by entity weight estimating module 110 using the semantic knowledge associated with the extracted known entities. In some embodiments, the semantic knowledge may include any types of semantic relations or links between the known entities, for example, product-of, CEO-of, spouse-of, or member-of, etc. In some other embodiments, the semantic knowledge may include any type of events related to the known entities, for example, product release, exhibition, tournament, technology forum, etc. It should be appreciated that the semantic knowledge between the entities is not limited to the above examples but can be any aspects associated the entities over a time period, a geographic range, an attribute field, etc. It should be understood that the user's interest level with respect to any named entity can be represented in various format. Thus, the weight indicating the user's known interest level may include a numerical representation, a percentage representation, a five star scaled representation, a text description, a graphical illustration, etc. Further, it should be understood that the components shown in FIG. 1 are for illustrative purpose, and the present teaching is not intended to be limiting.

Entity augmenting module 104 is configured to augment the known entity list 116 in accordance with information from knowledge archive 120. Entity augmenting module 104 first links the extracted known entities to corresponding entities in knowledge archive 120. The linking of the known entities to knowledge archive 120 is based on an exact match or a similarity match. For example, the linking of known entity "Steve Jobs" to "Tim Cook" in knowledge archive 120 is based on a similarity match. Entity augmenting module 104 further identities inferred entities from knowledge archive 120 that are related to the known entities in various semantic aspects such as categories, attributes, facts, hierarchical structured relations, etc. Entity augmenting module 104 further generates a set of augmented entity lists 118 to include known entities, inferred entities related to the known entities from knowledge archive 120, and the semantic relationships between the known entities and the inferred entities. In some embodiments, each augmented entity list includes a known entity and one or more inferred entities that are semantically related to the known entity. For example, an augmented entity list may include known entity "Michael Jordan" and inferred entities "Chicago Bulls," "NBA," "Basketball," and "Sports." The semantic relationships between "Michael Jordan" and the inferred entities include member-of-team, player-of-league, professional-of-sports, etc. In some embodiments, different augmented entity lists may define different aspects of semantic relationships between the known entities and the inferred entities. For example, for known entity "Steve Jobs," the first augmented entity list may include inferred entities "Apple" and "iPhone," and the second augmented entity list may include inferred entities "Tim Cook," "Marissa Mayer," and "CEO." The semantic relationship defined in the first augmented list is product-of, while the semantic relationship defined in the second augmented list is CEO-of. It should be appreciated that the semantic relations between the named entities are not limited to the above noted examples. Any relations discovered via a plurality of content sources, such as the scientific publications, content from social media networks, online news articles, etc. can be adopted by knowledge archive 120. In some embodiments, the semantic relations between the named entities may be entitled with attribute information including time period from first observed, geographic information of two semantically related named entities, frequencies of the semantic relations that are observed, robustness and/or expansion of the semantic relations, etc.

Figure 5:
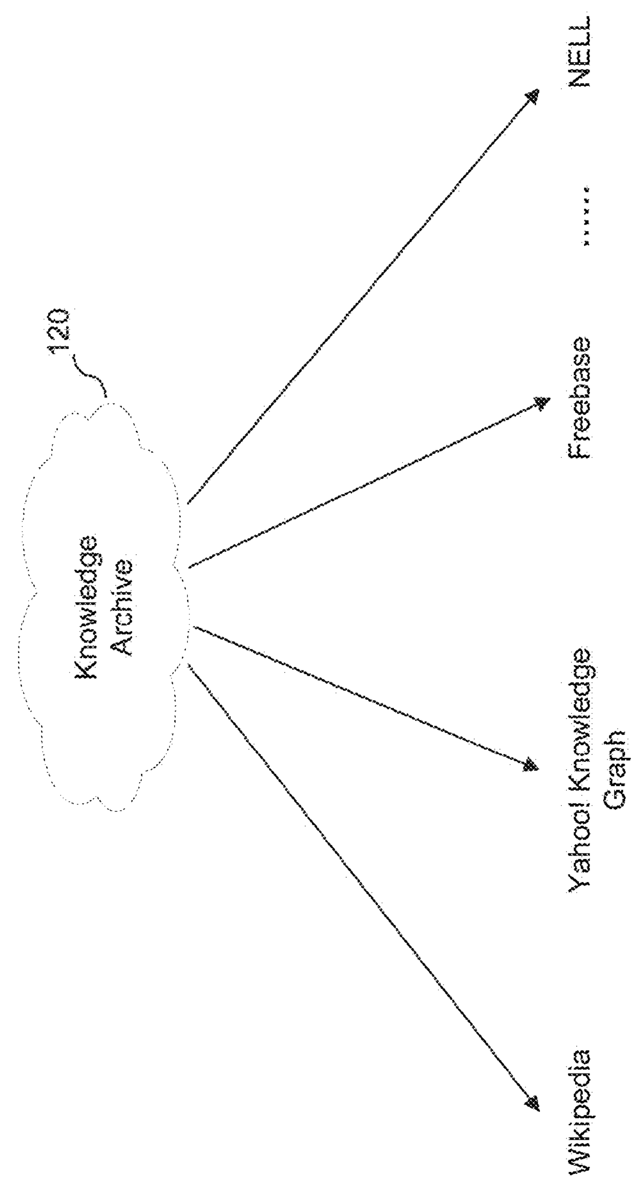
FIG. 5 illustrates an example of the knowledge archive, according to an embodiment of the present teaching.

Knowledge archive 120 may be an online encyclopedia such as Wikipedia, an indexing system such as an online dictionary, a corporation knowledge base such as Yahoo knowledge graph, a community-level knowledge base such as Freebase, Nell, etc., as shown in FIG. 5. Knowledge archive 120 provides a classification or categorization system to classify both user data as well as content. Such a classification structure may interpret user interest profiles in multiple dimensions, and provide entity augmenting module 104 with a multi-dimensional semantic understanding of the named entities.

Entity clustering module 106 is configured to generate a set of hierarchical clusters 124 based on information provided by the set of augmented entity lists. Each hierarchical cluster illustrates one or more hierarchical relations between the entities, and includes one or more super-entities on the top layer and a plurality of entities on the lower layer. The super-entity may denote a hierarchical attribute, category, character, etc. of the entities that are linked beneath the super-entities. In some embodiments, each of the set of hierarchical cluster may be consistent with the semantic relationship defined in the corresponding augmented entity list. In yet some other embodiments, the hierarchical cluster may be generated using one or more combinations of the semantic relationships defined in the set of augmented entity lists. Entity clustering module 106 may select one or more clustering models 122 to generate the set of hierarchical clusters. Clustering models 122 may define a number of clusters to be generated, a number of cluster nodes within each cluster, the graphic structure of each cluster, and other aspects of the cluster. In some embodiments, entity clustering module 106 may apply one clustering model to generate the set of hierarchical clusters. In yet some other embodiments, entity clustering module 106 may apply different clustering models with respect to different aspects of the semantic relationships defined in augmented entity lists 118.

Each entity in augmented entity lists 118 is modeled as a node in one or more hierarchical clusters. Each known entity in augmented entity lists 118 is assigned with a weight estimated by entity weight estimating module 110 indicating the user's known interest level. Each inferred entity in augmented entity lists 118 may be initialized with a zero weight indicating that the user's interest to the inferred entity is yet unknown. It should be appreciated that the weight indicating the user's inferred interest strength may include a numerical representation, a percentage representation, a five star scaled representation, a text description, a graphical illustration, etc.

User profile generating module 108 is configured to receive the set of hierarchical clusters indicating a set of user interest aspects and generate a set of user profiles. User profile generating module 108 may comprise a user interest estimating module 112 and a training module 114. User interest estimating module 112 estimates a weight for each inferred entity based on the semantic knowledge associated with the inferred entity and the known entities obtained from knowledge archive 120. User interest estimating module 112 further re-scores the weight for each known entity to reflect the degree of user interest in accordance with the estimated weights of the inferred entities and the semantic relationships between the each known entity and the inferred entities. In some embodiments, the entity augmentation, the entity clustering, and the user interest estimation may perform several iterations to ensure thorough investigation of knowledge archive 120. In some embodiments, to estimate the user interest or the entity weight accurately, a training model may be employed using stored user interaction data under sparsity, for example, from user activity database 140. The training model may include a latent factor model, a factorization machine, and/or other models based on factor inference or analysis. After all entities in the set of hierarchical clusters are assigned with the estimated weights, training module 114 applies the factorization machine, for example, to train one or more parameters associated with the model using user interaction data. The trained factorization machine or the latent factor model is further used to predict the user interest based on the set of hierarchical clusters, and generate a user profile 126 to be used to personalize content recommendation. The generated user profile 126 may be stored in user profile database 128 locally and/or over the network.

Content pool 150 may be a general content pool to serve all users or have personalized content pools with respect to different users. Content pool 150 may be constructed as a hierarchical structure with a top layer of the general content pool and several low layers of the personalized content pools. Content pool 150 is dynamically updated in accordance with the user online activities. When a user 130 visits a content source 136, a user activity analyzer 132 receives information related to the activities of user 130 and logs the received activities in a user activity log 134. User activity analyzer 132 further analyzes information related to the activities of user 130 and determines whether there is a newly detected interest from the user. In some embodiments, when there is a newly detected interest from the user, content crawler 138 fetches new content from content source 136 and updates content pool 150. In some embodiments, when there is a newly detected interest from the user, entity extractor 102 may be triggered to obtain information from the newly updated content pool 150 and identifies newly discovered entities related to the newly detected user interest.

Figure 2:
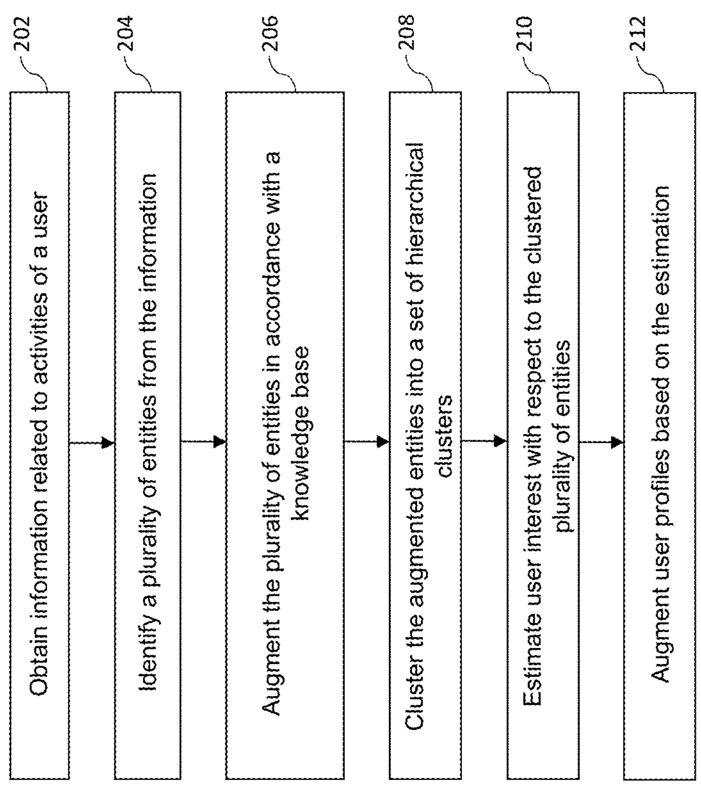
FIG. 2 illustrates an exemplary flowchart of the user profiling system, according to an embodiment of the present teaching.

FIG. 2 illustrates an exemplary flowchart of the user profiling system, according to an embodiment of the present teaching. The flowchart presented below is intended to be illustrative. In some embodiments, the flowchart may be accomplished with one or more additional operations not described, and/or without one or more of the operations discussed. Additionally, the order in which the operations of the flowchart as illustrated in FIG. 2 and described below is not intended to be limiting. Information related to activities of a user is obtained at 202. Based on the obtained information, a plurality of entities is identified at 204 reflecting the interests of the user. At 206, the plurality of entities is augmented in accordance with a knowledge archive. The augmented entities are clustered into a set of hierarchical clusters at 208. At 210, user interest with respect to the clustered augmented entities is estimated. Further, a user profile based on the set of hierarchical clusters is generated at 212. In some embodiments, when the user profile is previously constructed, the user profile is updated or augmented based on the set of hierarchical clusters is generated at 212.

Figure 3:
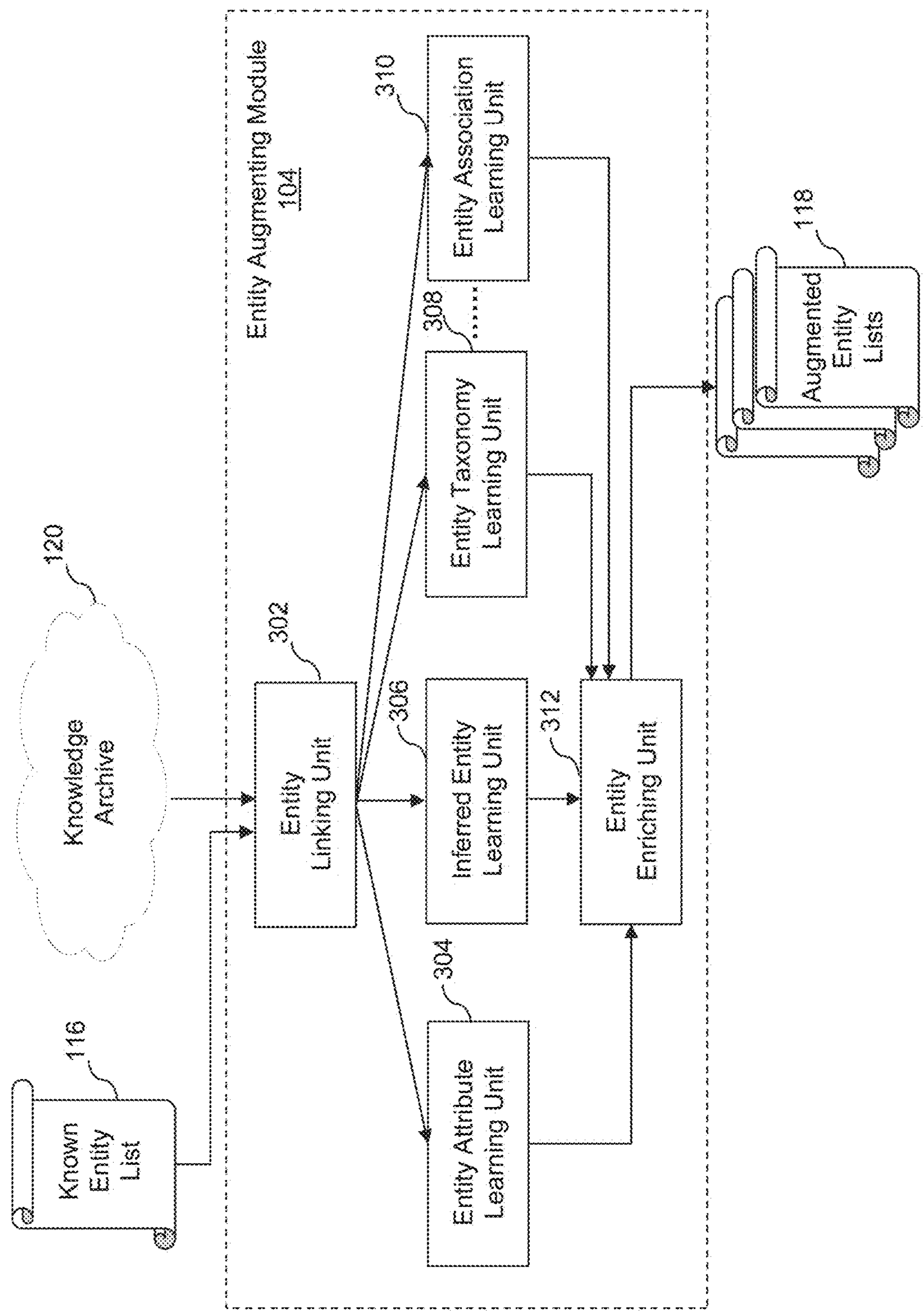
FIG. 3 illustrates an exemplary system diagram of an entity augmenting module, according to an embodiment of the present teaching.

FIG. 3 illustrates an exemplary system diagram of an entity augmenting module, according to an embodiment of the present teaching. Entity augmenting module 104 shown in FIG. 1 may include an entity linking unit 302, an entity attribute learning unit 304, an inferred entity learning unit 306, an entity taxonomy learning unit 308, an entity relationship learning unit 310, and an entity enriching unit 312. Entity linking unit 302 receives known entity list 116 and links each known entity with one or more additional entities in knowledge archive 120. The linkage of the known entity with the one or more additional entities may be based on exact matching of the entity words or similarities of the entities words. For example, an entity from knowledge archive 120 being an alternation of the known entity word is considered linked to the known entity. Entity attribute learning unit 304 is configured to obtain attribute information related to the linked known entity from knowledge archive 120. For example, the entity "title" is categorized in the attribute "book" in an online dictionary database. Inferred entity learning unit 306 is configured to obtain one or more inferred entities that are semantically related to the linked known entity. Entity taxonomy learning unit 308 is configured to obtain information related to a classification or categorization of the linked known entity. In some embodiments, the entity attribute information and the entity taxonomy information may be defined the same or differently in accordance with different sources of knowledge archive. Entity relationship learning unit 310 is configured to obtain information of the semantic relationship between the linked known entity and any inferred entities in knowledge archive 120. Entity enriching unit 312 receives the outputs from entity attribute learning unit 304, inferred entity learning unit 306, entity taxonomy learning unit 308, and entity relationship learning unit 310 to generate a set of augmented entity lists 118. It should be understood that the components of entity augmenting module 104 shown in FIG. 3 are for illustrative purpose, and the present teaching is not intended to be limiting. Entity augmenting module 104 may comprise more learning units in order to thoroughly discover the inferred entities. In some embodiments, the multiple learning units may be integrated such that entity augmenting module 104 comprises less components than illustrated. Further, it should be appreciated that entity augmenting module 104 may obtain information from one or more other knowledge archives in addition to the illustrated knowledge archive 120. As different knowledge archives may have different knowledge definition and structure, entity augmenting module 104 may further comprise additional components to process and integrate knowledges from various archives.

Figure 4:
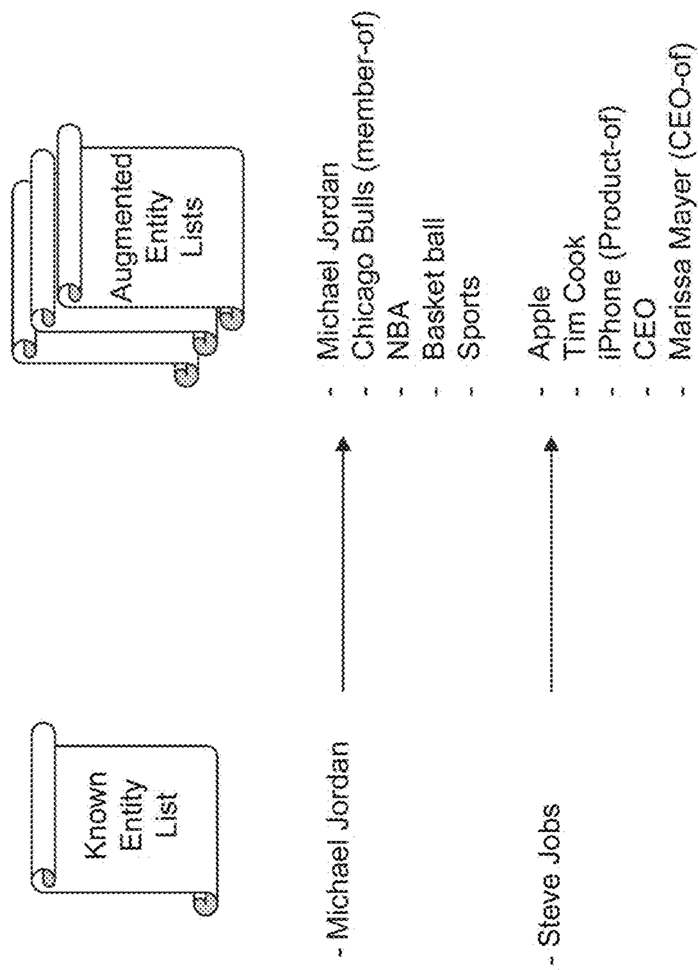
FIG. 4 illustrates an example of the entity augmentation, according to an embodiment of the present teaching.

FIG. 4 illustrates an example of the entity augmentation, according to an embodiment of the present teaching. A known entity "Michael Jordan" is augmented to include inferred entities "Chicago Bulls," "NBA," "Basketball," and "Sports." The inferred entity may be accompanied by enriched information, for example, "Chicago Bulls" is accompanied by a semantic relationship description "member-of" Further, known entity "Steve Jobs" is augmented to include inferred entities "Apple," "Tim Cook," "iPhone," "CEO," and "Marissa Mayer," wherein "iPhone" is accompanied by a semantic relationship description "Product-of" and "Marissa Mayer" is accompanied by a semantic relationship description "CEO-of."

Figure 6:
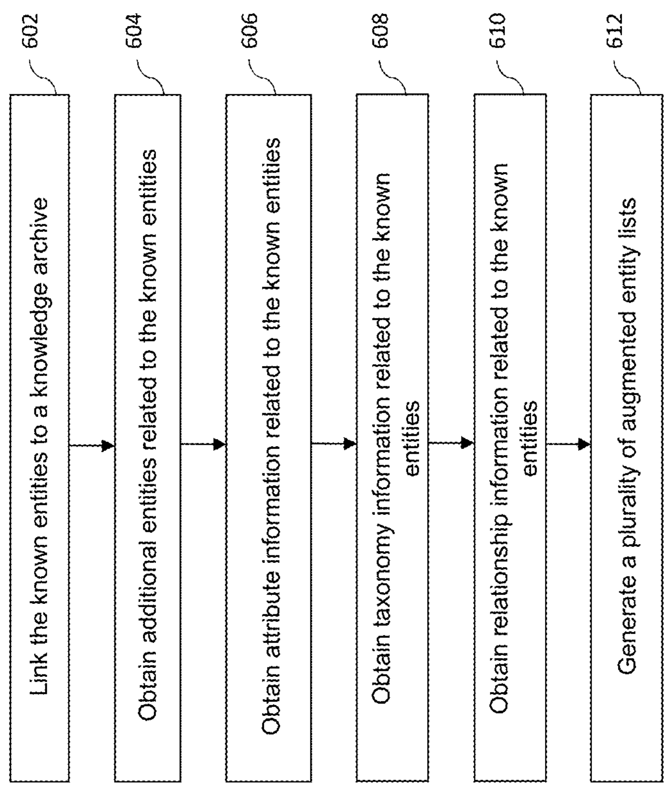
FIG. 6 an exemplary flowchart of the entity augmentation, according to an embodiment of the present teaching.

FIG. 6 an exemplary flowchart of the entity augmentation, according to an embodiment of the present teaching. In some embodiments, the flowchart may be accomplished with one or more additional operations not described, and/or without one or more of the operations discussed. Additionally, the order in which the operations of the flowchart as illustrated in FIG. 6 and described below is not intended to be limiting. The known entities are linked to a knowledge archive at 602. Additional entities related to the known entities are obtained at 604. Further, attribute information related to the known entities is obtained at 606; taxonomy information related to the known entities is obtained at 608; relationship information related to the known entities is obtained at 610. Based on the information obtained from the knowledge archive, a plurality of augmented entity lists is generated at 612.

Figure 7:
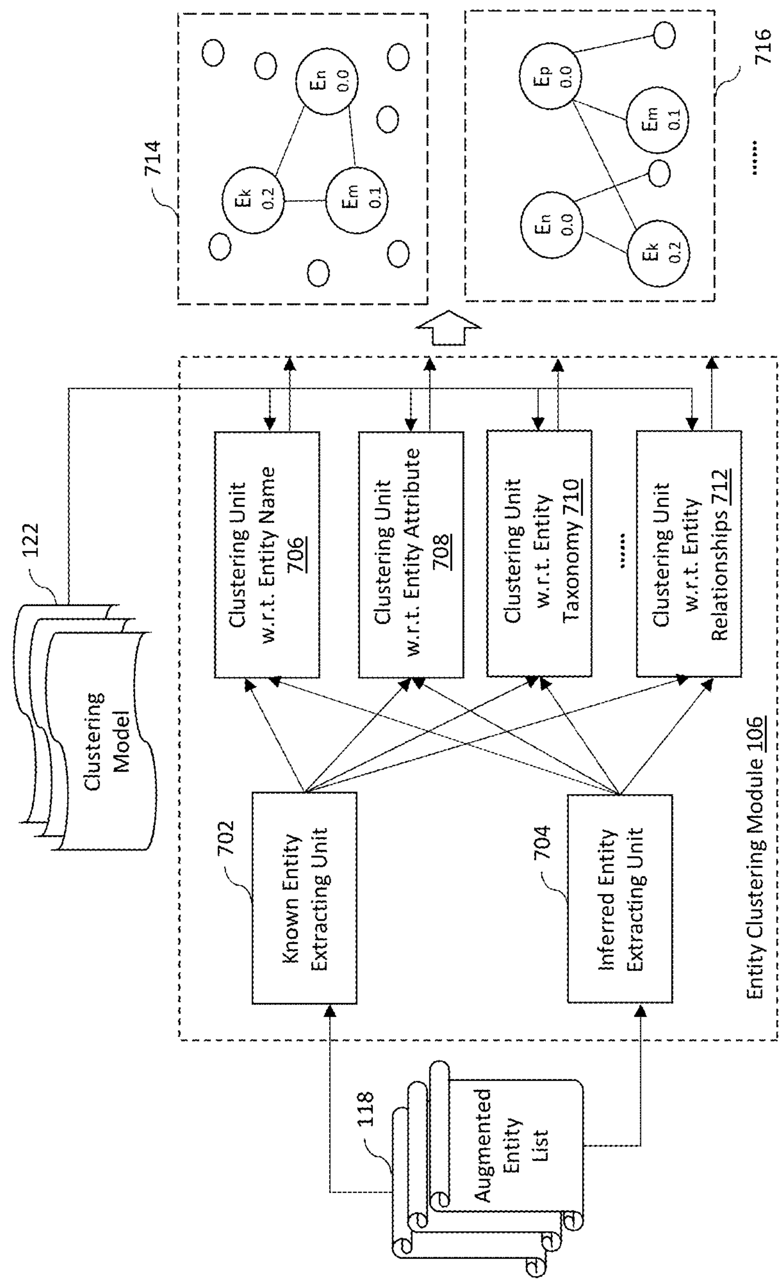
FIG. 7 illustrates an exemplary system diagram of an entity clustering module, according to an embodiment of the present teaching.

FIG. 7 illustrates an exemplary system diagram of an entity clustering module, according to an embodiment of the present teaching. Entity clustering module 104 shown in FIG. 1 may include a known entity extracting unit 702, an inferred entity extracting unit 704, a clustering unit with respect to (w.r.t) entity name 706, a clustering unit w.r.t. entity attribute 708, a clustering unit w.r.t. entity taxonomy 710, and a clustering unit w.r.t. entity relationships 712. Known entity extracting unit 702 and inferred entity extracting unit 704 extract the known entities and the inferred entities from augmented entity list 118, respectively. Further, the known entities and the inferred entities are selectively grouped into one or more clusters. For example, clustering unit w.r.t entity name 706 groups one or more known entities and their related inferred entities in one cluster; clustering unit w.r.t. entity attribute 708 groups the known entities and the inferred entities in one cluster if they belong to the same attribute; clustering unit w.r.t. entity taxonomy 710 groups the known entities and the inferred entities in one cluster if they are defined as the same taxonomy; and clustering unit w.r.t. entity relationships 712 groups the known entities and the inferred entities in one cluster if these entities have the same semantic relationship. Each clustering unit of clustering unit w.r.t. entity name 706, clustering unit w.r.t. entity attribute 708, clustering unit w.r.t. entity taxonomy 710, and clustering unit w.r.t. entity relationships 712 may use the same or individual clustering model 122. For example, clustering unit w.r.t. entity name 706 may use a mesh network structure having one known entity and top five inferred entities. In yet another example, clustering unit w.r.t. entity taxonomy 710 may use a hierarchical tree structure illustrating multiple layers of entities in the aspect of taxonomy. It should be understood that the components of entity clustering module 106 are for illustrative purpose, and the present teaching is not intended to be limiting. The entity clustering may be based on other aspects related to the named entities. In some embodiments, the various clustering units may be integrated in one unit for processing. As a known entity may be used in different clusters, information related to the different aspects related to the known entity may be included in the cluster. For example, linkage information between two clusters sharing the same known entity may be included in the generated clusters. In some embodiments, the semantic relations between two entities may be denoted within each cluster in the form of numerical numbers, percentage numbers, graphical illustrations, text descriptions, etc.

As illustrated in FIG. 7, cluster 714 is an example of a mesh network structure having known entities $E_k$ and $E_m$, and inferred entity $E_n$. $E_k$ and $E_m$ are assigned with weight 0.2 and 0.1, respectively, based on relational inference. $E_n$ is newly inferred entity from the knowledge archive and is assigned with zero weight. Cluster 716 is an example of a hierarchical tree structure having known entities $E_k$ and $E_m$, and inferred entity $E_n$ and $E_p$, wherein $E_n$ is a higher level entity relative to $E_k$, and $E_p$ is a higher level entity relative to $E_m$.

Figure 8:
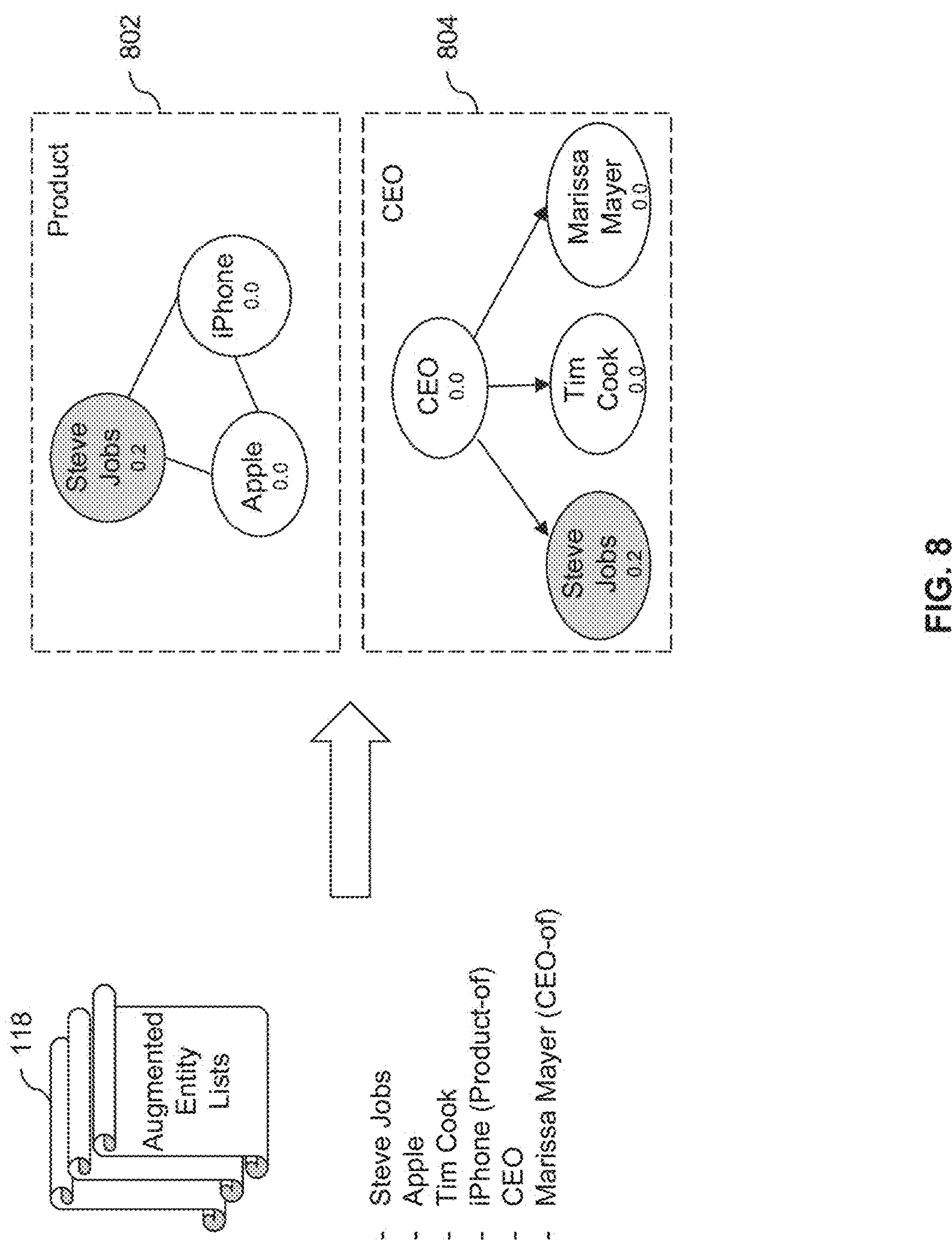
FIG. 8 illustrates an example of the entity clustering, according to an embodiment of the present teaching.

FIG. 8 illustrates an example of the entity clustering, according to an embodiment of the present teaching. Augmented entity list 118 with respect to known entity "Steve Jobs" is grouped into two clusters 802 and 804. Cluster 802 includes two inferred entities "Apple" and "iPhone" as being products of Steve Job's company. Cluster 804 includes inferred entities "Tim Cook" and "Marissa Mayer," and the inferred entities and the known entity "Steve Jobs" belong to attribute "CEO."

Figure 9:
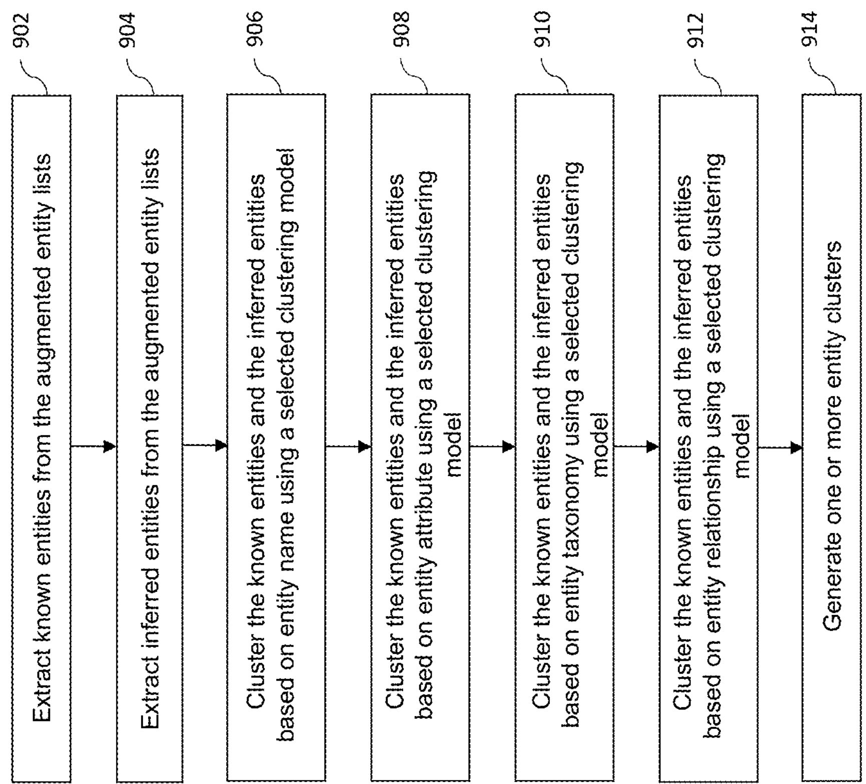
FIG. 9 illustrates an exemplary flowchart of the entity clustering, according to an embodiment of the present teaching.

FIG. 9 illustrates an exemplary flowchart of the entity clustering, according to an embodiment of the present teaching. In some embodiments, the flowchart may be accomplished with one or more additional operations not described, and/or without one or more of the operations discussed. Additionally, the order in which the operations of the flowchart as illustrated in FIG. 9 and described below is not intended to be limiting. Known entities are extracted from the augmented entity lists at 902. Inferred entities are extracted from the augmented entity lists at 904. Further, the known entities and the inferred entities are clustered based on entity name using a selected clustering model at 906; the known entities and the inferred entities are clustered based on entity attribute using a selected clustering model at 908; the known entities and the inferred entities are clustered based on entity taxonomy using a selected clustering model at 910; and the known entities and the inferred entities are clustered based on entity relationships using a selected clustering model at 912. Based on the multiple clustering schemes, one or more entity clusters are generated at 914.

Figure 10:
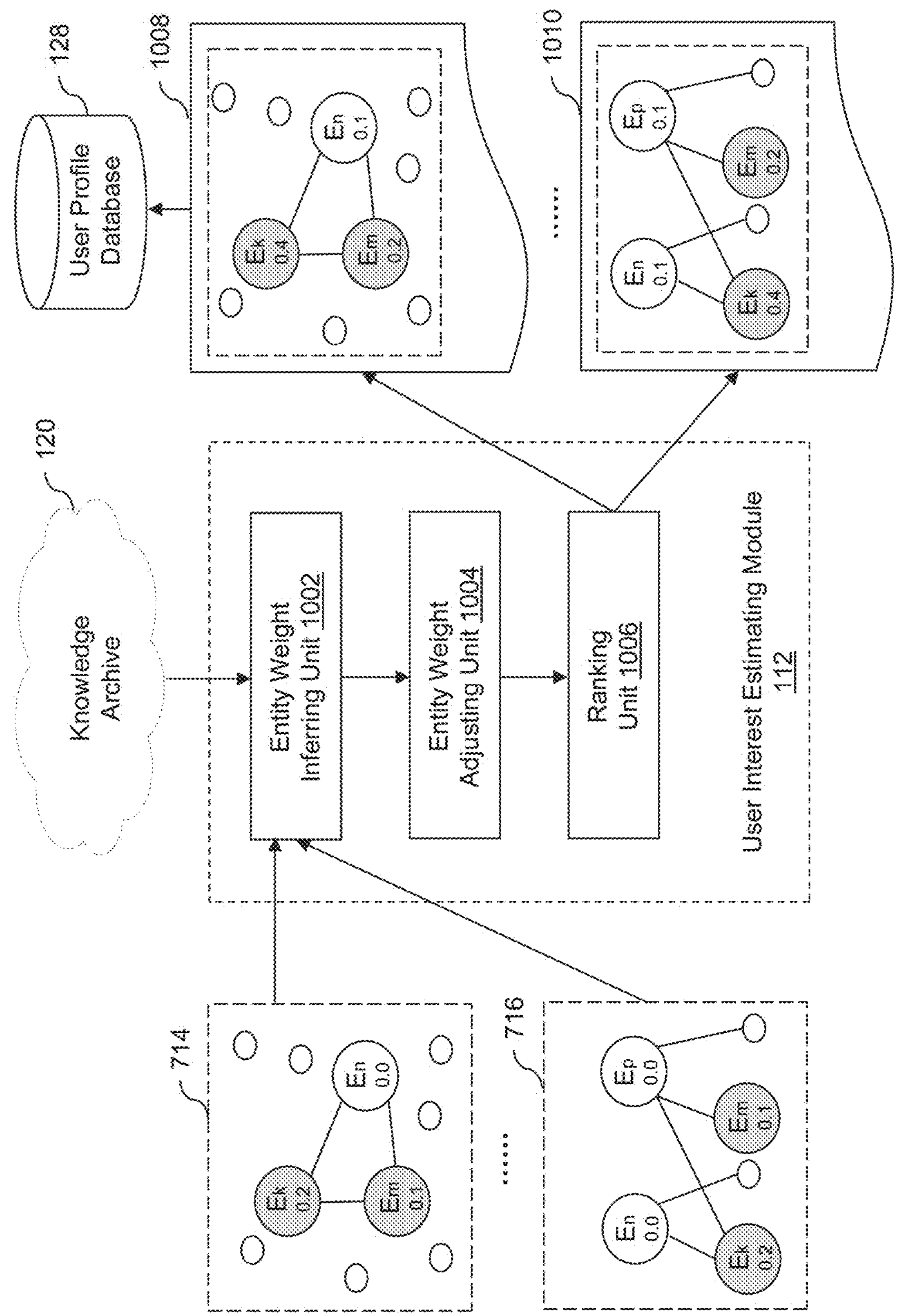
FIG. 10 illustrates an exemplary system diagram of a user interest estimating module, according to an embodiment of the present teaching.

FIG. 10 illustrates an exemplary system diagram of a user interest estimating module. User interest estimation module 112 shown in FIG. 1 comprises an entity weight inferring unit 1002, an entity weight adjusting unit 1004, and a ranking unit 1006. Entity weight inferring unit 1002 receives information related to the set of hierarchical clusters. Such information includes cluster node information, for example, the name of the entity denoted by the cluster node and the initial weight of the entity. In some embodiments, such information may further include relation information between the cluster nodes denoted as a linkage weight between two cluster nodes. Entity weight inferring unit 1002 estimates the weight for each inferred entities within a cluster based on the relation information obtained from knowledge archive 120. Once the inferred entities are assigned with initial weights, entity weight adjusting unit 1004 re-scores the weights of the known entities within the cluster. In some embodiments, entity weight adjusting unit 1004 increases the weight of each known entities equally on the basis on the weight of an inferred entity connected therewith. In yet other embodiments, entity weight adjusting unit 1004 may redistribute the weights between the related known entities based on the relational factors between the known entities and the inferred entity. Ranking unit 1006 ranks the rescored entities within the cluster. A user profile is then generated including one or more profile pages corresponding to the set of hierarchical clusters. The user profile includes information related to the user's known interests and the user's potential interests represented by the known entities and the inferred entities, respectively. Each of the known entities and the inferred entities is accompanied by additional information indicating the user's interest level with respect to a particular entity. The user's interest level may be denoted by numerical number, percentage number, a textual description, etc. Each profile page indicates an aspect of the user's interests, and thus, the generated user profile is a multi-aspect of the user's interests. As shown in FIG. 10, user profile page 1008 and user profile page 1010 are generated based on cluster 714 and cluster 716, respectively. It should be understood that the components shown in FIG. 10 are for illustrative purpose, and the present teaching is not intended to be limiting. More or less units may be included in user interest estimating module 112.

Figure 11:
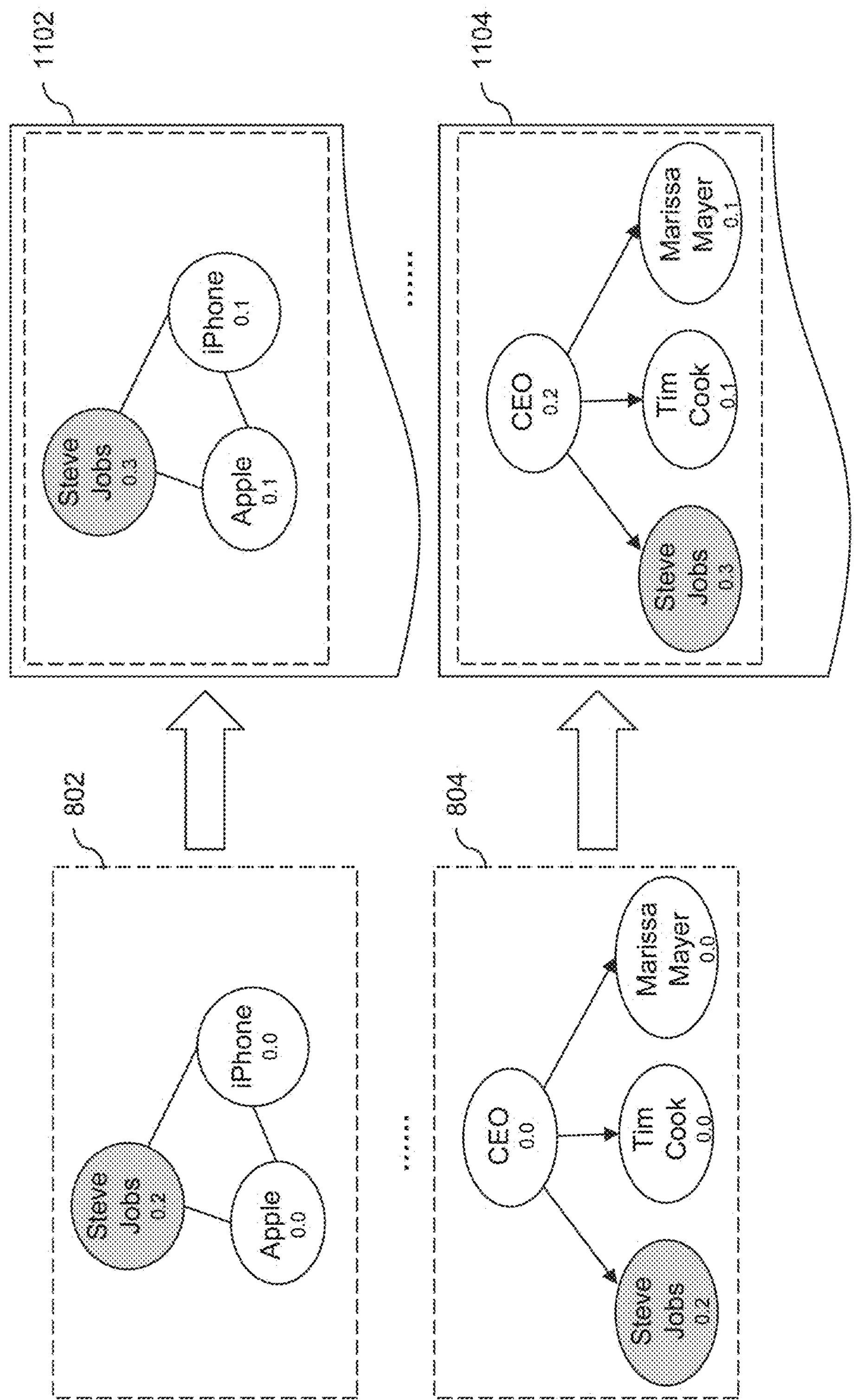
FIG. 11 illustrates an example of the user interest estimating, according to an embodiment of the present teaching.

FIG. 11 illustrates an example of the user interest estimating, according to an embodiment of the present teaching. User profile page 1102 and user profile page 1104 are generated based on cluster 802 and cluster 804, respectively. User profile page 1102 illustrates the user's interest level in known entity "Steve Jobs" as being 0.3, the user's interest level in inferred entity "Apple" as being 0.1, and the user's interest level in inferred entity "iPhone" as being 0.1. Comparing to cluster 802, the user's interest level in known entity "Steve Jobs" is increased from 0.2 to 0.3 in accordance with the assignment of user interests to the inferred entities "Apple" and "iPhone." User profile page 1102 may be interpreted as the user's interests in the aspect of Apple products. In another example, user profile page 1104 illustrates the user's interest level in known entity "Steve Jobs" as being 0.3, the user's interest level in inferred entities "Tim Cook" as being 0.1, "Marissa Mayer" as being 0.1, and "CEO" as being 0.1. User profile page 1104 may be interpreted as the user's interests in the aspect of CEO of high tech companies.

Figure 12:
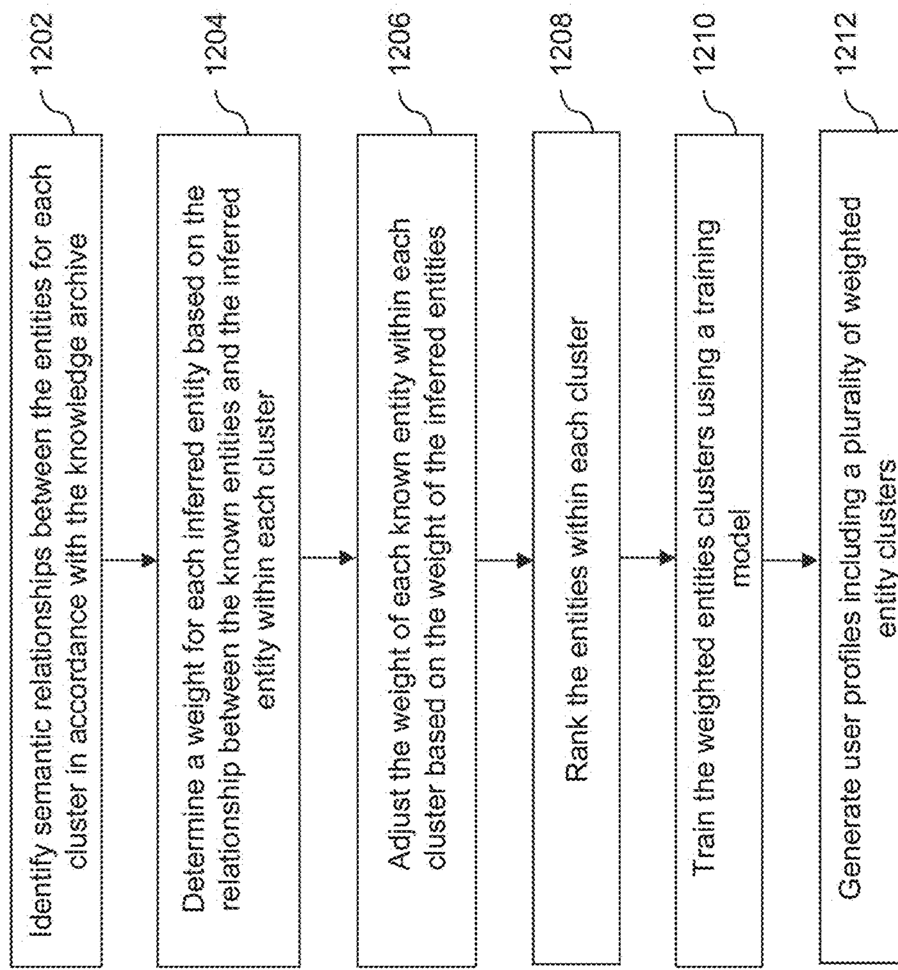
FIG. 12 illustrates an exemplary flowchart of the user interest estimating, according to an embodiment of the present teaching.

FIG. 12 illustrates an exemplary flowchart of the user interest estimating, according to an embodiment of the present teaching. In some embodiments, the flowchart may be accomplished with one or more additional operations not described, and/or without one or more of the operations discussed. Additionally, the order in which the operations of the flowchart as illustrated in FIG. 12 and described below is not intended to be limiting. Semantic relationships between the entities for each cluster are identified in accordance with the knowledge base at 1202. A weight for each inferred entity is determined based on the relationship between the known entities and the inferred entities within each cluster at 1204. The weight of each known entity within each cluster is adjusted based on the weight of the inferred entities at 1206. The entities within each cluster are ranked at 1208. The weighted entities based clusters are further trained using a training model at 1210. User profiles including a plurality of weighted entity clusters in hierarchical structure are generated at 1212.

Figure 13:
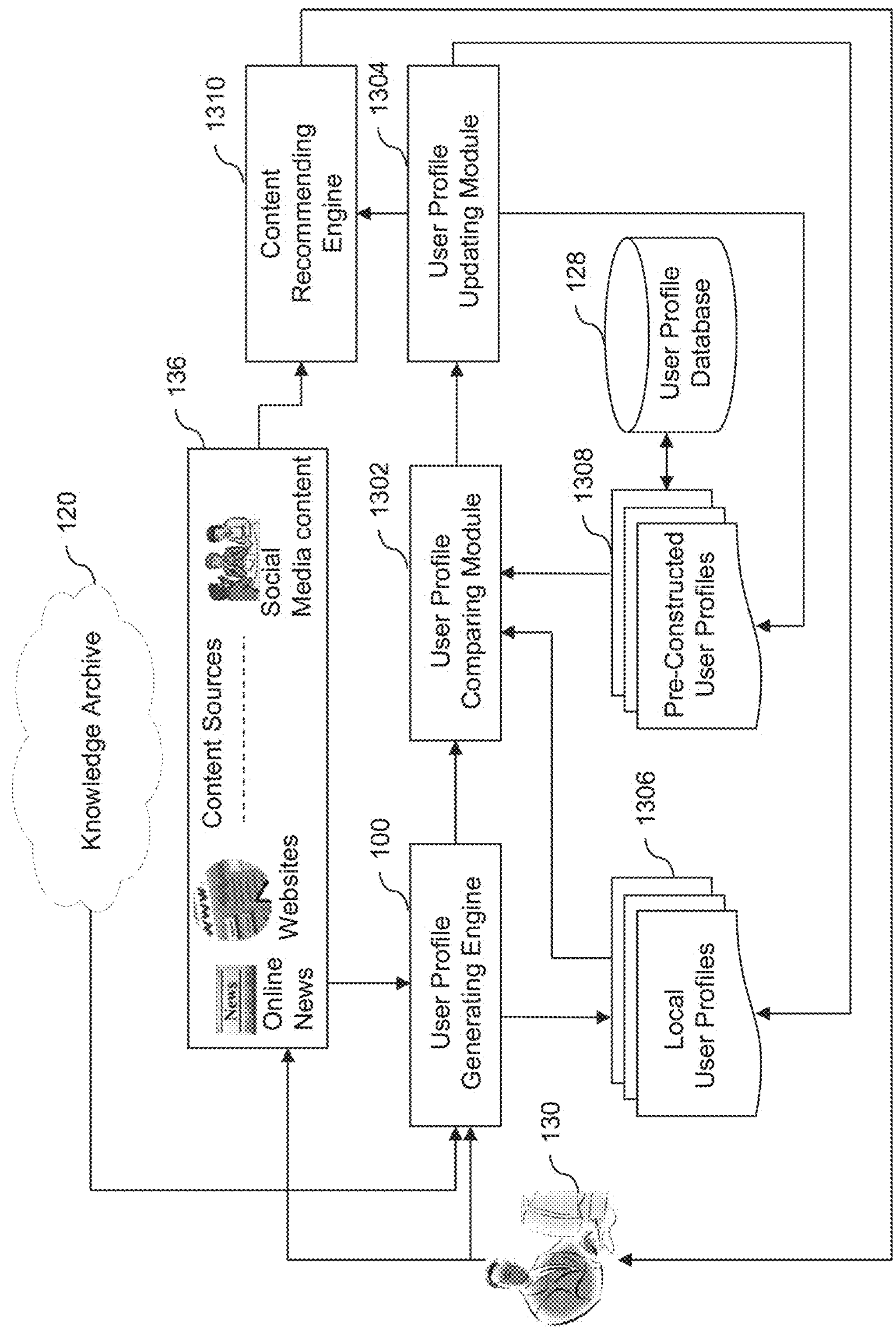
FIG. 13 illustrates an exemplary system diagram of user profiling for content recommendation, according to an embodiment of the present teaching.

FIG. 13 illustrates an exemplary system diagram of user profiling for content recommendation, according to an embodiment of the present teaching. The system of user profiling for content recommendation comprises a user profile generating engine 100 as shown in FIG. 1, a user profile comparing module 1302, a user profile updating module 1304, and a content recommending engine 1310. The multiple hierarchical entity cluster based profile for each user may be used to infer each user's future interests and recommend content based on the inferred future interest. When an input such as a new feed or a new query is received from user 130, user profile generating engine 100 generates local profile 1306. The process of generating a local user profile based on the user input, content that the user has visited or viewed, and knowledge archive 120 is described above and thus, is not detailed herein. User profile comparing module 1302 receives the generated local user profile 1306 and compares it with a pre-constructed user profile 1308 associated with the user. Based on the comparison result, user profile updating module 1304 updates local user profile 1306 and pre-constructed user profile 1308. The updated pre-constructed user profile 1308 is further saved in user profile database 128. Content recommending engine 1310 is configured to recommend content in response to the user input based on the up-to-date user profile. If the prediction of the user's future interests is considered positive or the user's feedback on the recommended content is positive, newly identified named entities are utilized to incrementally update the multiple hierarchical entity cluster based profile of each user. Meanwhile, the new knowledge can be incorporated into the local profile for each user after a certain size of feeds (e.g., 10 feeds) or a certain time period (e.g., one day).

Figure 14:
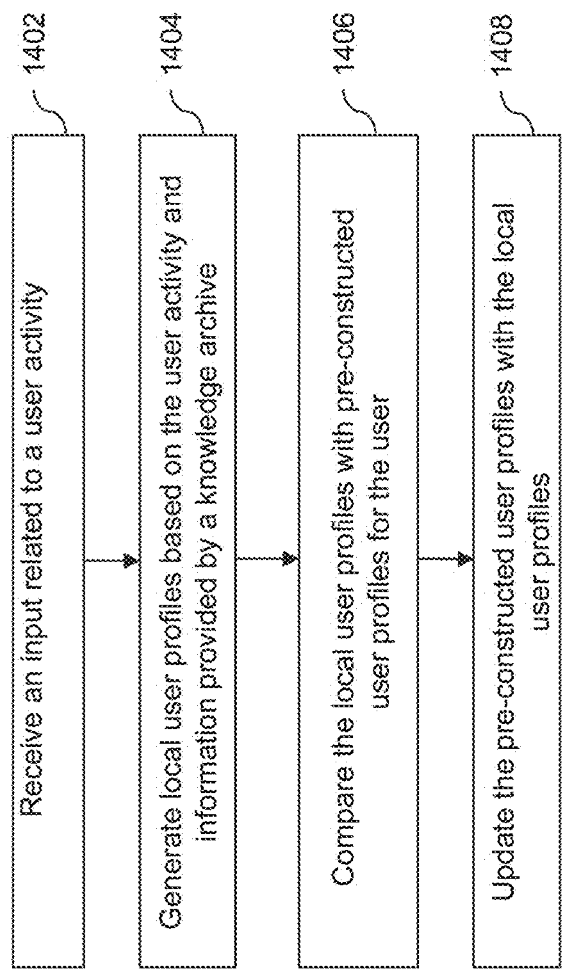
FIG. 14 illustrates an exemplary flowchart of user profiling for content recommendation, according to an embodiment of the present teaching.

FIG. 14 illustrates an exemplary flowchart of user profiling for content recommendation, according to an embodiment of the present teaching. In some embodiments, the flowchart may be accomplished with one or more additional operations not described, and/or without one or more of the operations discussed. Additionally, the order in which the operations of the flowchart as illustrated in FIG. 14 and described below is not intended to be limiting. An input related to a user activity is received at 1402. Local user profiles are generated based on the user activity and information provided by a knowledge archive at 1404. The local user profiles are compared with the pre-constructed user profiles at 1406. The pre-constructed user profiles are updated with the local user profiles at 1408.

Figure 15:
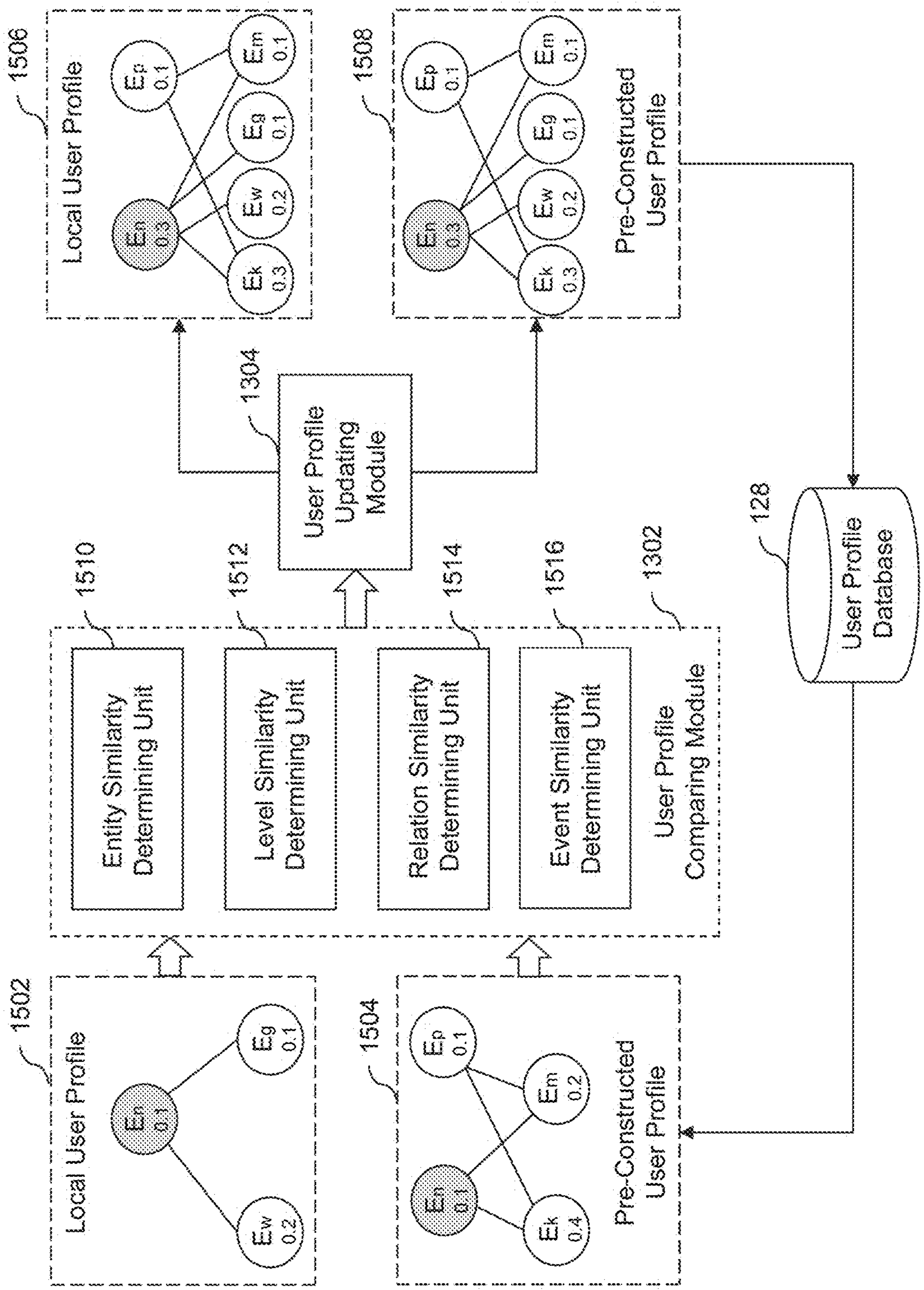
FIG. 15 illustrates an example of augmenting the user profile in response to a user input, according to an embodiment of the present teaching.

FIG. 15 illustrates an example of augmenting the user profile in response to a user input, according to an embodiment of the present teaching. User profile comparing module 1302 shown in FIG. 13 may comprise an entity similarity determining unit 1510, a level similarity determining unit 1512, a relation similarity determining unit 1514, and an event similarity determining unit 1516. The entity clustering and profile comparison may be performed using various levels/granularities of the hierarchical clusters or a knowledge graph with different similarity metrics. Entity similarity determining unit 1510 is configured to compare a local user profile with a pre-constructed user profile and determine an entity-based similarity. For example, entity similarity determining unit 1510 captures similar entities, e.g., Steve Jobs→Tim Cook. Level similarity determining unit 1512 is configured to determine a level-based similarity between the local user profile and the pre-constructed user profile. For example, level similarity determining unit 1512 determines latent characteristics or super-entities, e.g., Steve Jobs & Tim Cook→(executives of) Apple, Inc. Relation similarity determining unit 1514 is configured to determine a relation-based similarity between the local user profile and the pre-constructed user profile. For example, relation similarity determining unit 1514 denotes the entities that share the similar relationship, e.g., Tim Cook & Apple, Inc.→Marissa Mayer & Yahoo! Inc. Event similarity determining unit 1516 is configured to determine an event-based similarity degree between the local user profile and the pre-constructed user profile. For example, event similarity determining unit 1516 determines the entities that may get involved in the same event or the same category of event, e.g., iPhone, iPad, Apple Watch→new (Apple) product release. It should be understood that the components shown in FIG. 15 are for illustrative purpose, and the present teaching is not intended to be limiting. The local user profile and the pre-constructed user profile may be compared in accordance with criteria other than that are illustrated.

User profile updating module 1304 then updates the local user profile and the pre-constructed user profile based on the various aspects of the comparisons. In some embodiments, a logistic regression classifier may be used to determine if the user has an interest in the current news feed or search result. As illustrated in FIG. 15, local user profile 1502 is compared with pre-constructed user profile 1504. A higher-level super entity similarity En is discovered. Consequently, local user profile 1502 is updated to new version 1506 that includes related entities from pre-constructed user profile 1504; and pre-constructed user profile 1504 is updated to new version 1508 that includes related entities from local user profile 1502.

Figure 16:
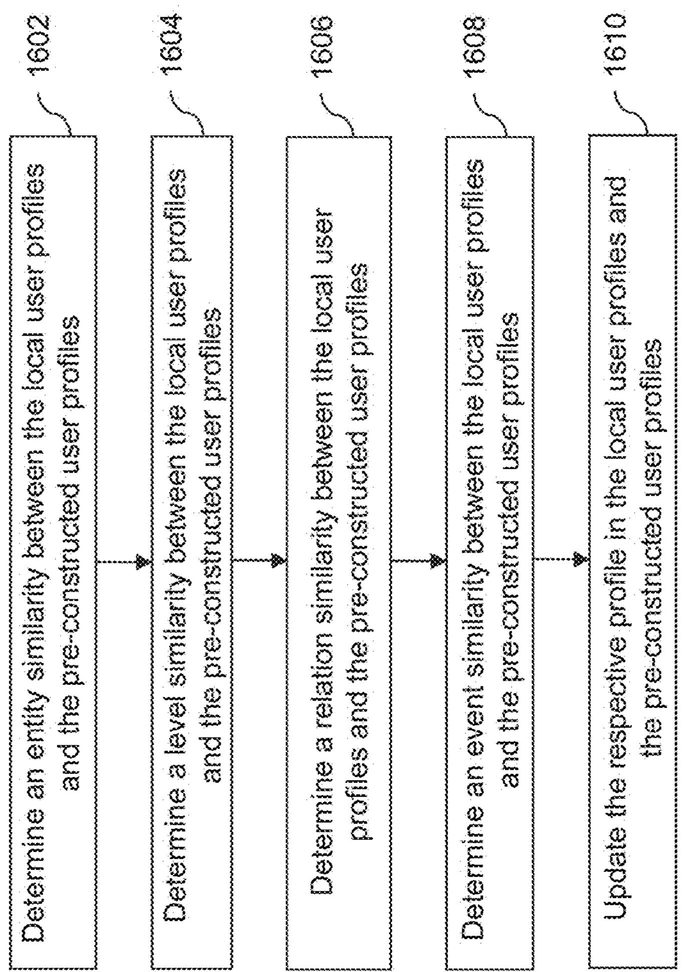
FIG. 16 illustrates an exemplary flowchart of augmenting the user profile in response to a user input, according to an embodiment of the present teaching.

FIG. 16 illustrates an exemplary flowchart of augmenting the user profile in response to a user input, according to an embodiment of the present teaching. In some embodiments, the flowchart may be accomplished with one or more additional operations not described, and/or without one or more of the operations discussed. Additionally, the order in which the operations of the flowchart as illustrated in FIG. 16 and described below is not intended to be limiting. An entity similarity between the local user profiles and the pre-constructed user profiles is determined at 1602. An inferred entity similarity or a higher-level similarity between the local user profiles and the pre-constructed user profiles is determined at 1604. A relation similarity between the local user profiles and the pre-constructed user profiles is determined at 1606. An event similarity between the local user profiles and the pre-constructed user profiles is determined at 1608. Further, the respective profile in the local user profiles and the pre-constructed user profiles are updated at 1610.

Figure 17:
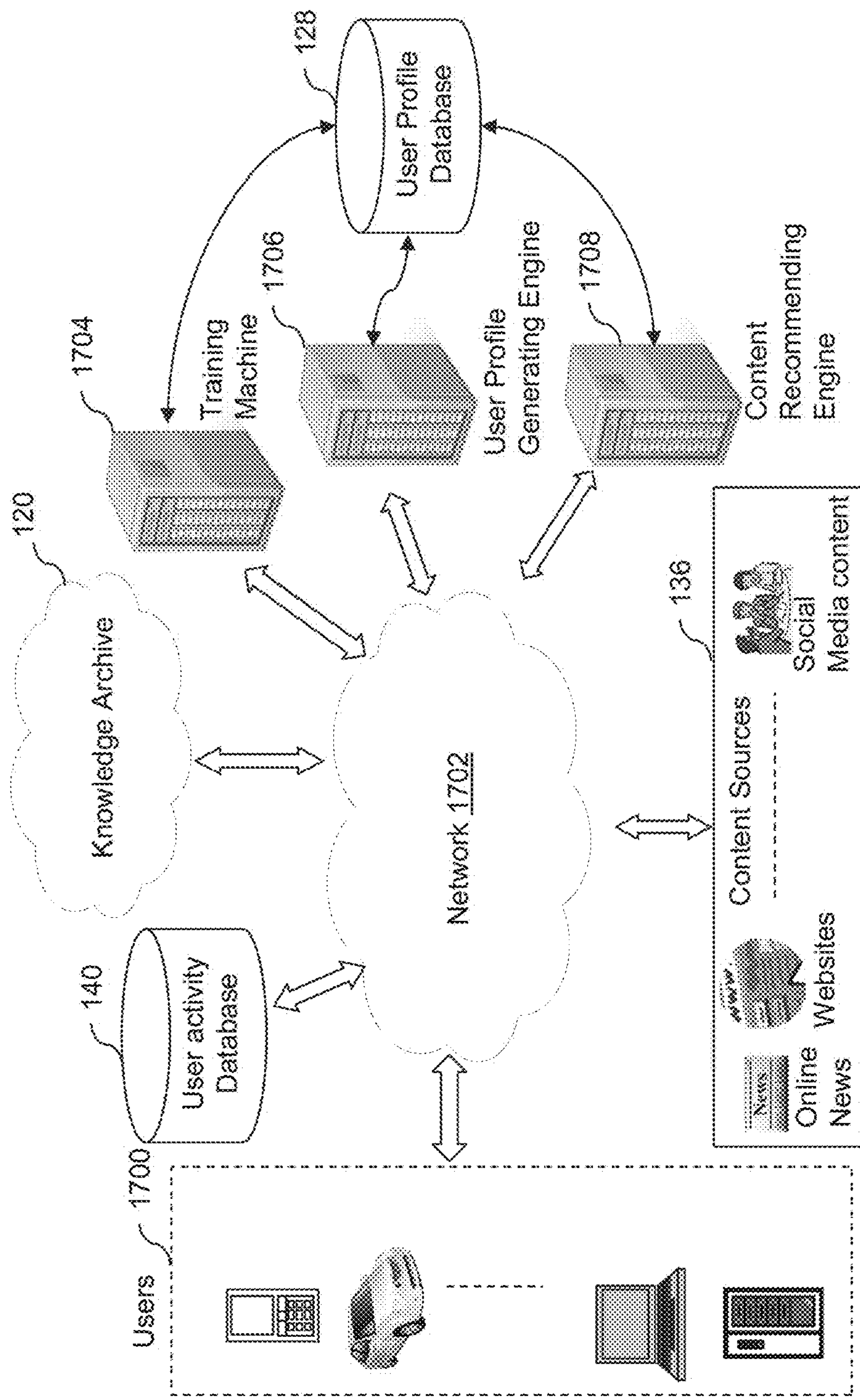
FIG. 17 illustrates a network environment of a user profiling system for content recommendation, according to an embodiment of the present teaching.

FIG. 17 illustrates a network environment of a user profiling system for content recommendation, according to an embodiment of the present teaching. The network environment of a user profiling system for content recommendation includes users 1700, a plurality of content sources 136, a network 1702, a training machine 1704, a user profile generating engine 1706, a content recommending engine 1708, a user activity database 140, a knowledge archive 120, and a user profile database 128. User 1700 may connect to network 1702 via various types of devices, for example, a desktop computer, a laptop computer, a mobile device, a built-in device in a motor vehicle, etc. Network 1702 may be a single network or a combination of multiple networks. For example, network 1702 may be a local area network (LAN), a wide area network (WAN), a public network, a private network, a proprietary network, a Public Telephone Switched Network (PSTN), the Internet, a wireless communication network, a virtual network, or any combination thereof. Training machine 1704, user profile generating engine 1706, and content recommending engine 1708 may be configured to connect to network 1702 individually and communicate with user activity database 140 via network 1702 in response to an input to generate user profiles. User profile database 128 may communicate directly with training engine 1704, user profile generating engine 1706, and content recommending engine 1708. In some embodiments, user profile database 128 may be located in a cloud remotely accessible via network 1702. The plurality of content sources 136 may supply new entities, new feedbacks, etc. to update user activity database 140. The above components of the network environment of a content recommendation system are for illustrative purpose, and may include more or less components than illustrated.

Figure 18:
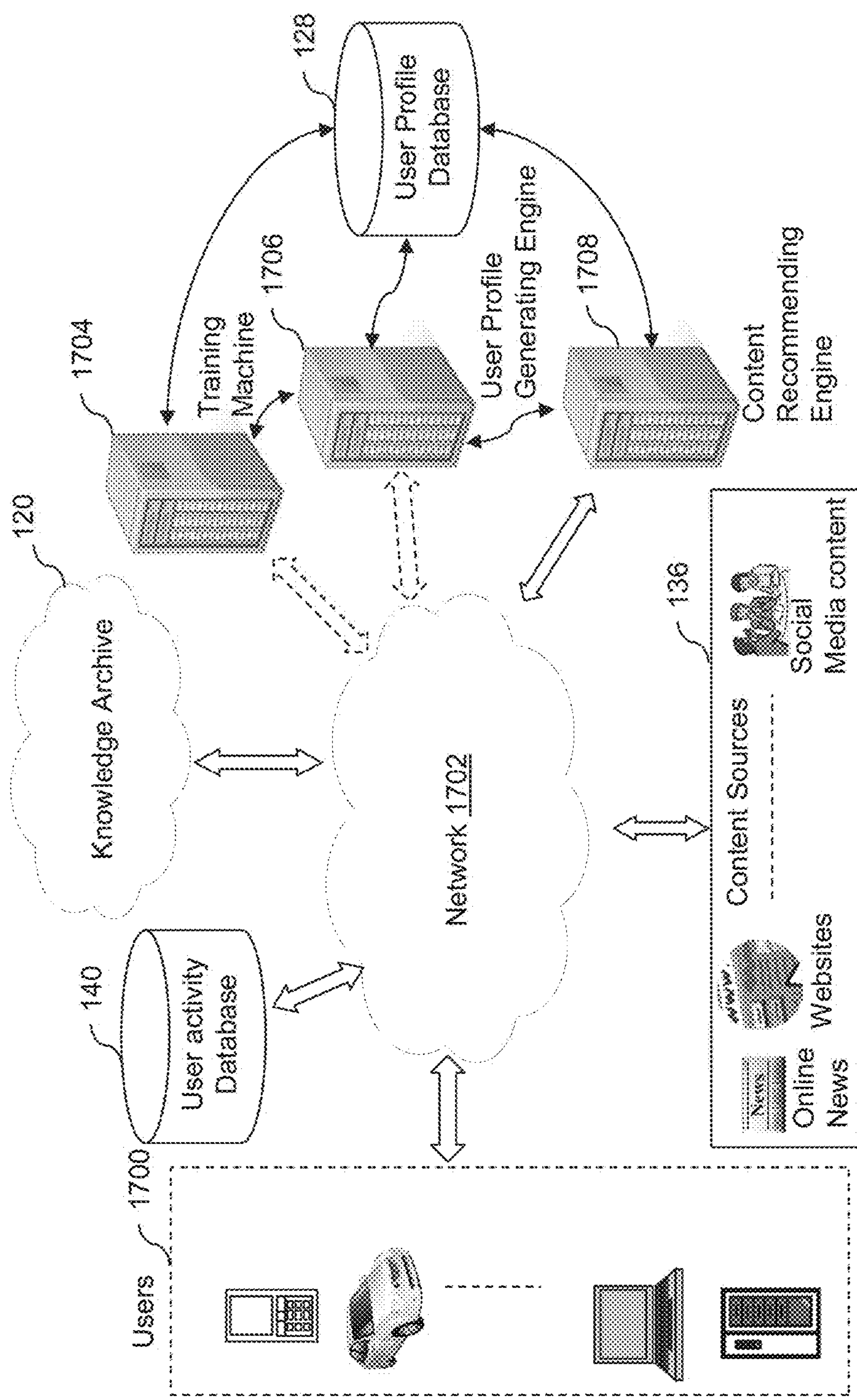
FIG. 18 illustrates a network environment of a user profiling system for content recommendation, according to another embodiment of the present teaching.

FIG. 18 illustrates a network environment of a user profiling system for content recommendation, according to another embodiment of the present teaching. The network environment illustrated herewith is similar to FIG. 17, except that training engine 1704 and user profile generating engine 1706 are backend engines connected to content recommending engine 1708. Training engine 1704 and user profile generating engine 1706 may function individually and separately from content recommending engine 1708, and the functions of training engine 1704 and user profile generating engine 1706 may be invoked via content recommending engine 1708. In some embodiments, training engine 1704 and user profile generating engine 1706 may be incorporated into content recommending engine 1708 and function as one single component.

Figure 19:
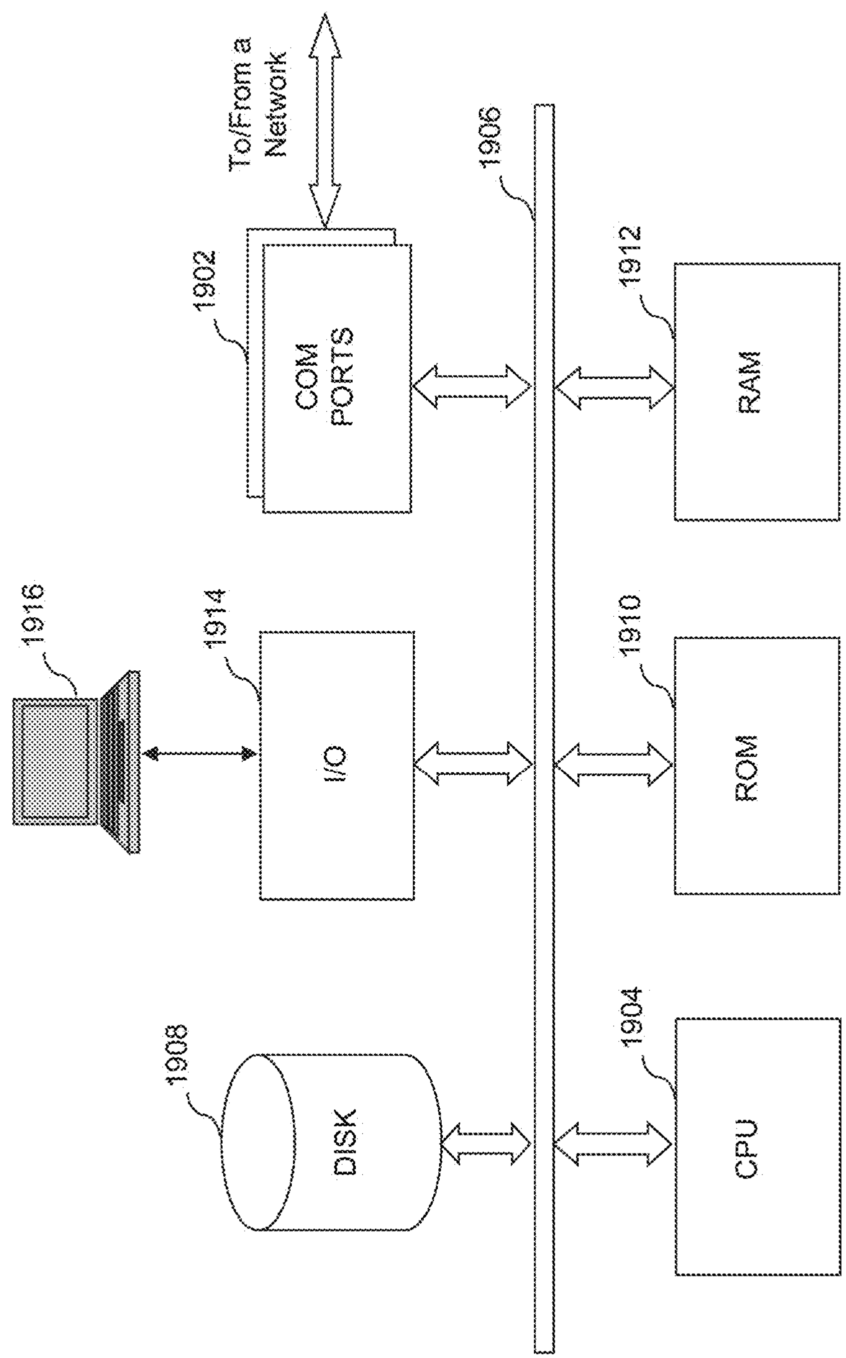
FIG. 19 depicts a general computer architecture on which the present teaching can be implemented.

FIG. 19 depicts a general computer architecture on which the present teaching can be implemented. The computer may be a general-purpose computer or a special purpose computer. This computer can be used to implement any components of the system for user profiling and content recommendation as described herein. Different components of the systems disclosed in the present teaching can all be implemented on one or more computers such as computer, via its hardware, software program, firmware, or a combination thereof. Although only one such computer is shown, for convenience, the computer functions relating to content recommendation may be implemented in a distributed fashion on a number of similar platforms, to distribute the processing load.

The computer, for example, includes COM ports 1902 connected to and from a network connected thereto to facilitate data communications. The computer also includes a CPU 1904, in the form of one or more processors, for executing program instructions. The exemplary computer platform includes an internal communication bus 1906, program storage and data storage of different forms, e.g., disk 1908, read only memory (ROM) 1910, or random access memory (RAM) 1912, for various data files to be processed and/or communicated by the computer, as well as possibly program instructions to be executed by the CPU 1904. The computer also includes an I/O component 1914, supporting input/output flows between the computer and other components therein such as user interface elements 1916. The computer may also receive programming and data via network communications.

Hence, aspects of the methods of user profiling for recommending content, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computing device having at least one processor, storage, and a communication platform connected to a network for generating user profiles with semantic knowledge, the method comprising:

obtaining first information associated with activities of a user;

identifying one or more entities from the first information;

generating a list of augmented entities from the one or more entities based on second information, wherein the list of augmented entities includes the one or more entities, one or more inferred entities, and information indicating semantic relationships between the one or more entities and the one or more inferred entities, wherein each of the one or more inferred entities is assigned an initial weight, the initial weight being a weight of zero;

updating, for each of the one or more inferred entities, the initial weight associated thereto with an updated weight determined based on the semantic relationships between the one or more entities and the one or more inferred entities, wherein the updated weight is estimated using a latent factor model trained with user interaction data;

clustering the list of augmented entities into a set of hierarchical clusters based on (i) the semantic relationships between the one or more entities and the one or more inferred entities, and (ii) the updated weight for each of the one or more inferred entities; and generating a set of profiles for the user based on the set of hierarchical clusters, wherein each profile is to be used to personalize content recommendations for the user.

2. The method of claim 1, wherein generating the list of augmented entities comprises:

identifying the one or more inferred entities from the second information, wherein the one or more inferred entities relate to the one or more entities; and adding the one or more inferred entities to the one or more entities to generate the list of augmented entities, wherein the second information comprises a knowledge archive of named entities.

3. The method of claim 2, further comprising:

estimating user interests with respect to the list of augmented entities; and incorporating the user interests with respect to the list of augmented entities into the set of profiles.

4. The method of claim 3, wherein estimating the user interests with respect to the list of augmented entities further comprises:

identifying known user interests with respect to the one or more entities based on the information indicating the semantic relationships between the one or more entities and the one or more inferred entities;

estimating inferred user interests with respect to the one or more inferred entities based on the information indicating the semantic relationships between the one or more entities and the one or more inferred entities; and estimating a strength of the user interests with respect to the list of augmented entities in accordance with the known user interests and the inferred user interests.

5. The method of claim 1, further comprising:

receiving an input related to a user activity;

generating one or more local user profiles based on the user activity and the information indicating the semantic relationships between the one or more entities and the one or more inferred entities;

determining comparison results by comparing the one or more local user profiles with at least one profile of the set of profiles of the user; and generating at least one updated profile of the set of profiles of the user by updating at least one profile of the set of profiles of the user with the one or more local user profiles, wherein the at least one updated profile is to be used to personalize the content recommendations for the user.

6. The method of claim 1, wherein the one or more entities are identified from the first information based on:

an exact match or a similarity match between a first entity of the one or more entities and a first known entity from one or more known entities in a knowledge archive; or a semantic relationship between a second entity of the one or more entities and a second known entity from the one or more known entities in the knowledge archive.

7. A system having at least one processor, storage, and a communication platform for generating user profiles with semantic knowledge, the system comprising:

a user activity analyzer, implemented by the at least one processor, configured to obtain first information associated with activities of a user;

an entity extractor, implemented by the at least one processor, configured to identify one or more entities from the first information;

an entity augmenting module, implemented by the at least one processor, configured to generate a list of augmented entities from the one or more entities based on second information, wherein the list of augmented entities includes the one or more entities, one or more inferred entities, and information indicating semantic relationships between the one or more entities and the one or more inferred entities, wherein each of the one or more inferred entities is assigned an initial weight, the initial weight being a weight of zero;

an entity clustering module, implemented by the at least one processor, configured to:

update, for each of the one or more inferred entities, the initial weight associated thereto with an updated weight determined based on the semantic relationships between the one or more entities and the one or more inferred entities, wherein the updated weight is estimated using a latent factor model trained with user interaction data, and cluster the list of augmented entities into a set of hierarchical clusters based on (i) the semantic relationships between the one or more entities and the one or more inferred entities, and (ii) the updated weight for each of the one or more inferred entities; and a user profile generating module, implemented by the at least one processor, configured to generate a set of profiles for the user based on the set of hierarchical clusters, wherein each profile of the set of profiles is to be used to personalize content recommendations for the user.

8. The system of claim 7, wherein the entity augmenting module is further configured to:

identify the one or more inferred entities from the second information, wherein the one or more inferred entities relate to the one or more entities; and add the one or more inferred entities to the one or more entities to generate the list of augmented entities, wherein the second information includes semantic knowledge associated with the list of augmented entities.

9. The system of claim 8, further comprising:

a user interest estimating module, implemented by the at least one processor, configured to:

estimate user interests with respect to the list of augmented entities; and incorporate the user interests with respect to the list of augmented entities into the set of profiles.

10. The system of claim 9, wherein the user interest estimating module configured to:

identify known user interests with respect to the one or more entities based on the information indicating the semantic relationships between the one or more entities and the one or more inferred entities;

estimate inferred user interests with respect to the one or more inferred entities based on the information indicating the semantic relationships between the one or more entities and the one or more inferred entities; and estimate a strength of the user interests with respect to the list of augmented entities in accordance with the known user interests and the inferred user interests.

11. The system of claim 7, wherein:

each hierarchical cluster of the set of hierarchical clusters defines a hierarchical relationship between the one or more entities and the one or more inferred entities of the list of augmented entities; and each hierarchical cluster of the set of hierarchical clusters is generated using a clustering model with respect to different aspects of the semantic relationships between the one or more entities and the one or more inferred entities defined in the list of augmented entities.

12. A non-transitory machine-readable medium having information recorded thereon for generating profiles for a user, wherein the information, when read by the machine, effectuates operations comprising:

obtaining first information associated with activities of a user;

identifying one or more entities from the first information;

generating a list of augmented entities from the one or more entities based on second information, wherein the list of augmented entities includes the one or more entities, one or more inferred entities, and information indicating semantic relationships between the one or more entities and the one or more inferred entities, wherein each of the one or more inferred entities is assigned an initial weight, the initial weight being a weight of zero;

updating, for each of the one or more inferred entities, the initial weight associated thereto with an updated weight determined based on the semantic relationships between the one or more entities and the one or more inferred entities, wherein the updated weight is estimated using a latent factor model trained with user interaction data;

clustering the list of augmented entities into a set of hierarchical clusters based on (i) the semantic relationships between the one or more entities and the one or more inferred entities, and (ii) the updated weight for each of the one or more inferred entities; and generating a set of profiles for the user based on the set of hierarchical clusters, wherein each profile of the set of profiles is to be used to personalize content recommendations for the user.

13. The medium of claim 12, wherein generating the list of augmented entities comprises:

identifying the one or more inferred entities from the second information, wherein the one or more inferred entities relate to the one or more entities; and adding the one or more inferred entities to the one or more entities to generate the list of augmented entities, wherein the second information includes semantic knowledge associated with the list of augmented entities.

14. The medium of claim 13, wherein the operations further comprise:

estimating user interests with respect to the list of augmented entities; and incorporating the user interests with respect to the list of augmented entities into the set of profiles.

15. The medium of claim 14, wherein estimating the user interests further comprises:

identifying known user interests with respect to the one or more entities based on the information indicating the semantic relationships between the one or more entities and the one or more inferred entities;

estimating inferred user interests with respect to the one or more inferred entities based on the information indicating the semantic relationships between the one or more entities and the one or more inferred entities; and estimating a strength of the user interests with respect to the list of augmented entities in accordance with the known user interests and the inferred user interests.

16. The medium of claim 12, wherein:

each hierarchical cluster of the set of hierarchical clusters defines a hierarchical relationship between the one or more entities and the one or more inferred entities of the list of augmented entities; and each hierarchical cluster of the set of hierarchical clusters is generated using a clustering model with respect to different aspects of the semantic relationships between the one or more entities and the one or more inferred entities defined in the list of augmented entities.

17. A method implemented on a computing device having at least one processor, storage, and a communication platform connected to a network for recommending content using user profiling, the method comprising:

receiving an input from a user;

generating a set of user profiles based on information associated with activities of the user and a knowledge archive, wherein generating the set of user profiles comprises:

identifying one or more entities from the information, generating a list of augmented entities from the one or more entities based on the knowledge archive, wherein the list of augmented entities includes the one or more entities, one or more inferred entities, and semantic relationships between the one or more entities and the one or more inferred entities, wherein each of the one or more inferred entities is assigned an initial weight, the initial weight being a weight of zero, updating, for each of the one or more inferred entities, the initial weight associated thereto with an updated weight determined based on the semantic relationships between the one or more entities and the one or more inferred entities, wherein the updated weight is estimated using a latent factor model trained with user interaction data, clustering the list of augmented entities into a set of hierarchical clusters based on (i) the semantic relationships between the one or more entities and one or more inferred entities, and (ii) the updated weight for each of the one or more inferred entities, wherein the set of user profiles is generated based on the set of hierarchical clusters;

generating a set of augmented user profiles by augmenting the set of user profiles based on a set of pre-constructed user profiles; and recommending content to the user in response to the input based on the set of augmented user profiles, wherein each of the set of augmented user profiles defines an aspect of user interests with respect to a plurality of entities and semantic relationships between the plurality of entities.

18. The method of claim 17, wherein the set of user profiles comprises one or more local user profiles generated based on user activity and the semantic relationship between the one or more entities and the one or more inferred entities, generating the set of augmented user profiles comprises:

determining comparison results by comparing the one or more local user profiles with at least one pre-constructed user profile of the set of pre-constructed user profiles; and generating one or more updated user profiles by updating the at least one pre-constructed user profile with the one or more local user profiles, wherein the set of augmented user profiles comprises the one or more updated user profiles.

* * * * *